United States Patent
Tabata et al.

(10) Patent No.: US 11,572,057 B2
(45) Date of Patent: *Feb. 7, 2023

(54) CONTROL DEVICE FOR HYBRID VEHICLE FOR LIMITING SUPERCHARGER PRESSURE CHANGES DUE TO POWER LIMITS

(71) Applicant: TOYOTA JIDOSHA KABUSHIKI KAISHA, Toyota (JP)

(72) Inventors: Atsushi Tabata, Okazki (JP); Koichi Okuda, Toyota (JP); Tooru Matsubara, Toyota (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

This patent is subject to a terminal disclaimer.

(21) Appl. No.: 16/920,934

(22) Filed: Jul. 6, 2020

(65) Prior Publication Data

US 2021/0086752 A1    Mar. 25, 2021

(30) Foreign Application Priority Data

Sep. 19, 2019   (JP) .............. JP2019-170909

(51) Int. Cl.
```
F02B 37/10    (2006.01)
B60W 20/40    (2016.01)
B60W 20/30    (2016.01)
F02B 37/12    (2006.01)
B60W 10/12    (2012.01)
```
(Continued)

(52) U.S. Cl.
CPC .......... *B60W 20/40* (2013.01); *B60W 10/10* (2013.01); *B60W 10/12* (2013.01); *B60W 10/30* (2013.01);
(Continued)

(58) Field of Classification Search
CPC ...... F02B 39/10; F02B 37/12; F02D 41/0007; B60W 20/40; B60W 20/30; B60W 10/10;
(Continued)

(56) References Cited

U.S. PATENT DOCUMENTS

| 6,880,337 B2* | 4/2005 | Masuda .................. F02B 37/10 60/597 |
| 10,190,485 B2* | 1/2019 | Yamane .................. F02B 39/10 |

(Continued)

FOREIGN PATENT DOCUMENTS

| JP | 2009-208599 A | 9/2009 |
| JP | 2010-36705 A | 2/2010 |

(Continued)

OTHER PUBLICATIONS

Notice of Allowance issued in U.S. Appl. No. 16/924,399 dated Aug. 10, 2022.

*Primary Examiner* — Gonzalo Laguarda

(74) *Attorney, Agent, or Firm* — Oblon, McClelland, Maier & Neustadt, L.L.P.

(57) ABSTRACT

It is determined whether chargeable and dischargeable electric power of a battery which is a power storage device are limited. When it is determined that the chargeable and dischargeable electric power of the battery is limited, an electric power balance target value of the battery during gear shifting control in a stepped gear shifting unit which is a mechanical gear shifting mechanism is calculated. A smaller value is calculated as a change rate limit value when the chargeable and dischargeable electric power is small than when the chargeable and dischargeable electric power is great, and the calculated change rate limit value is used to perform gear shifting control in the stepped gear shifting unit.

6 Claims, 11 Drawing Sheets

(51) Int. Cl.
*B60W 10/10* (2012.01)
*B60W 10/30* (2006.01)

(52) U.S. Cl.
CPC ............ *B60W 20/30* (2013.01); *F02B 37/12* (2013.01); *B60W 2710/0638* (2013.01); *B60W 2710/1005* (2013.01)

(58) Field of Classification Search
CPC ................ B60W 10/12; B60W 10/30; B60W 2710/0638; B60W 2710/1005
See application file for complete search history.

(56) References Cited

U.S. PATENT DOCUMENTS

| | | | |
|---|---|---|---|
| 10,344,668 B2* | 7/2019 | Benjey | F02D 23/00 |
| 10,590,836 B2* | 3/2020 | McConville | F02B 37/16 |
| 10,895,197 B2* | 1/2021 | Buckland | F02B 37/10 |
| 2009/0227409 A1 | 9/2009 | Ito et al. | |
| 2014/0208745 A1* | 7/2014 | Suhocki | F02B 33/38 |
| | | | 60/273 |
| 2015/0336566 A1* | 11/2015 | Johri | F02N 11/0862 |
| | | | 290/31 |
| 2019/0003408 A1* | 1/2019 | Hata | F02B 39/10 |
| 2020/0240330 A1* | 7/2020 | Christensen | F01D 15/10 |
| 2021/0101583 A1* | 4/2021 | Omuro | B60K 6/445 |

FOREIGN PATENT DOCUMENTS

| | | |
|---|---|---|
| JP | 2014-144659 A | 8/2014 |
| JP | 2015-214184 A | 12/2015 |
| JP | 2016-203833 A | 12/2016 |

* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

FIG. 14

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

CONTROL DEVICE FOR HYBRID VEHICLE FOR LIMITING SUPERCHARGER PRESSURE CHANGES DUE TO POWER LIMITS

CROSS-REFERENCE TO RELATED APPLICATION

This application claims priority to Japanese Patent Application No. 2019-170909 filed on Sep. 19, 2019, incorporated herein by reference in its entirety.

BACKGROUND

1. Technical Field

The disclosure relates to a control device for a hybrid vehicle in which an engine with a supercharger, a first rotary machine, and a second rotary machine are connected to a differential mechanism.

2. Description of Related Art

A control device for a hybrid vehicle including an engine, a first rotary machine, a differential mechanism that includes a first rotary element which is connected to the engine in a power-transmittable manner, a second rotary element which is connected to the first rotary machine in a power-transmittable manner, and a third rotary element which is connected to a transmission member capable of transmitting power to driving wheels, a second rotary machine that is connected to the transmission member in a power-transmittable manner, and a power storage device that transmits and receives electric power to and from the first rotary machine and the second rotary machine is known. An example thereof is a control device for a hybrid vehicle which is described in Japanese Unexamined Patent Application Publication No. 2014-144659 (JP 2014-144659 A). JP 2014-144659 A discloses that a mechanical gear shifting mechanism is provided between a transmission member and driving wheels and gear shifting control of the mechanical gear shifting mechanism is performed such that a charging/discharging electric power balance of a power storage device during gear shifting control of the mechanical gear shifting mechanism reaches an electric power balance target value during gear shifting control.

SUMMARY

In a hybrid vehicle including an engine with a supercharger, when a supercharging pressure of the engine changes, a response delay of the supercharging pressure occurs and an engine torque changes, and thus the charging/discharging electric power balance of the power storage device may not be achieved well.

The disclosure provides a control device for a hybrid vehicle that can curb deterioration in charging/discharging electric power balance by enabling easy achievement of a charging/discharging electric power balance of a power storage device.

According to a first aspect, there is provided a control device for a hybrid vehicle including an engine with a supercharger, a first rotary machine, a differential mechanism that includes a first rotary element which is connected to the engine in a power-transmittable manner, a second rotary element which is connected to the first rotary machine in a power-transmittable manner, and a third rotary element which is connected to a transmission member capable of transmitting power to driving wheels, a second rotary machine that is connected to the transmission member in a power-transmittable manner, and a power storage device that transmits and receives electric power to and from the first rotary machine and the second rotary machine, the control device including: (a) a drive power control unit configured to control drive power such that a charging/discharging electric power balance of the power storage device reaches an electric power balance target value; and (b) a limitation unit configured to limit a rate of change of a supercharging pressure from the supercharger when charging/discharging electric power of the power storage device is limited during drive power control and to increase a limitation of the rate of change of the supercharging pressure when the limitation of the charging/discharging electric power is great more than when the limitation of the charging/discharging electric power is small.

A second aspect of the disclosure provides the control device for a hybrid vehicle according to the first aspect, wherein the limitation unit is configured to increase the limitation of the rate of change of the supercharging pressure when a rate of change of a rotation speed of the first rotary machine is great more than when the rate of change of the rotation speed of the first rotary machine is small.

A third aspect of the disclosure provides the control device for a hybrid vehicle according to the first or second aspect, wherein the limitation unit is configured to increase the limitation of the rate of change of the supercharging pressure when a response delay of the supercharging pressure is great more than when the response delay of the supercharging pressure is small.

A fourth aspect of the disclosure provides the control device for a hybrid vehicle according to any one of the first to third aspects, further including a compensation unit configured to compensate for unevenness in a torque which is output to the transmission member based on a difference between a required engine torque and an actual engine torque due to the limitation of the rate of change of the supercharging pressure using a torque of the second rotary machine.

A fifth aspect of the disclosure provides the control device for a hybrid vehicle according to any one of the first to fourth aspects, wherein the drive power control is gear shifting control of a mechanical gear shifting mechanism which is provided between the differential mechanism and the driving wheels.

A sixth aspect of the disclosure provides the control device for a hybrid vehicle according to the fifth aspect, wherein the limitation unit is configured to set the limitation of the rate of change of the supercharging pressure to be greater when a rate of change of a rotation speed of an AT input shaft of the mechanical gear shifting mechanism is great than when the rate of change of the rotation speed of the AT input shaft is small.

The control device for a hybrid vehicle according to the first aspect includes (a) a drive power control unit configured to control drive power such that a charging/discharging electric power balance of the power storage device reaches an electric power balance target value and (b) a limitation unit configured to limit a rate of change of a supercharging pressure from the supercharger when a charging/discharging electric power of the power storage device is limited during drive power control and to increase a limitation of the rate of change of the supercharging pressure when the limitation of the charging/discharging electric power is great more than when the limitation of the charging/discharging electric power is small. When a response delay of the supercharging pressure occurs, unevenness in the actual engine torque is likely to increase and the charging/discharging electric power balance of the power storage device is less likely to be achieved. Particularly, when the charging and discharging electric power of the power storage device is limited, the charging/discharging electric power balance is less likely to be achieved. The limitation of the rate of change of the supercharging pressure becomes greater and the unevenness in the actual engine torque becomes less when the limitation of the charging and discharging electric power is great than when the limitation of the charging and discharging electric power is small. Accordingly, it is possible to easily achieve the charging/discharging electric power balance and to curb deterioration in the charging/discharging electric power balance.

With the control device for a hybrid vehicle according to the second aspect of the disclosure, the limitation unit increases the limitation of the rate of change of the supercharging pressure when a rate of change of a rotation speed of the first rotary machine is great more than when the rate of change of the rotation speed of the first rotary machine is small. The unevenness in the actual engine torque due to a response delay of the supercharging pressure is more likely to increase and the charging/discharging electric power balance of the power storage device is less likely to be achieved when the rate of change of the rotation speed of the first rotary machine is great than when the rate of change of the rotation speed of the first rotary machine is small. The limitation of the rate of change of the supercharging pressure becomes greater and the unevenness in the actual engine torque becomes less when the rate of change of the rotation speed of the first rotary machine is great than when the rate of change of the rotation speed of the first rotary machine is small. Accordingly, it is possible to easily achieve the charging/discharging electric power balance and to curb deterioration in the charging/discharging electric power balance.

With the control device for a hybrid vehicle according to the third aspect of the disclosure, the limitation unit increases the limitation of the rate of change of the supercharging pressure when the response delay of the supercharging pressure is great more than when the response delay of the supercharging pressure is small. The unevenness in the actual engine torque is more likely to increase and the charging/discharging electric power balance of the power storage device is less likely to be achieved when the response delay of the supercharging pressure is great than when the response delay of the supercharging pressure is small. The limitation of the rate of change of the supercharging pressure becomes greater and the unevenness in the actual engine torque becomes less when the response delay of the supercharging pressure is great than when the response delay of the supercharging pressure is small. Accordingly, it is possible to easily achieve the charging/discharging electric power balance and to curb deterioration in the charging/discharging electric power balance.

The control device for a hybrid vehicle according to the fourth aspect of the disclosure further includes a compensation unit that compensates for unevenness in a torque which is output to the transmission member based on a difference between a required engine torque and an actual engine torque due to the limitation of the rate of change of the supercharging pressure using a torque of the second rotary machine. A difference occurs between the required engine torque and the actual engine torque and the torque output from the differential mechanism to the transmission member becomes uneven due to the limitation of the rate of change of the supercharging pressure. However, this unevenness can be compensated for using the torque of the second rotary machine, whereby it is possible to cope with an acceleration request from a driver.

With the control device for a hybrid vehicle according to the fifth aspect of the disclosure, the drive power control is gear shifting control of a mechanical gear shifting mechanism which is provided between the differential mechanism and the driving wheels. When a response delay of the supercharging pressure occurs during gear shifting control of the mechanism gear shifting mechanism, the unevenness in the actual engine torque is likely to increase and the charging/discharging electric power balance of the power storage device is less likely to be achieved. During gear shifting control of the mechanical gear shifting mechanism, the limitation of the rate of change of the supercharging pressure becomes greater and thus the unevenness in the actual engine torque becomes less when the limitation of the charging/discharging electric power is great than when the limitation of the charging/discharging electric power is small. Accordingly, it is possible to easily achieve the charging/discharging electric power balance and to curb deterioration in the charging/discharging electric power balance.

With the control device for a hybrid vehicle according to the sixth aspect of the disclosure, the limitation unit sets the limitation of the rate of change of the supercharging pressure to be greater when a rate of change of a rotation speed of an AT input shaft of the mechanical gear shifting mechanism is great than when the rate of change of the rotation speed of the AT input shaft is small. When a gear shifting time is decreased for the purpose of rapid gear shifting, the rate of change of the AT input rotation speed in the mechanical gear shifting mechanism is increased. The unevenness in the actual engine torque due to a response delay of the supercharging pressure is more likely to increase and the charging/discharging electric power balance of the power storage device is less likely to be achieved when the rate of change of the AT input rotation speed in the mechanical gear shifting mechanism is great than when the rate of change of the AT input rotation speed is small. The limitation of the rate of change of the supercharging pressure becomes greater and the unevenness in the actual engine torque becomes less when the rate of change of the AT input rotation speed in the mechanical gear shifting mechanism is great than when the rate of change of the AT input rotation speed is small. Accordingly, it is possible to easily achieve the charging/discharging electric power balance and to curb deterioration in the charging/discharging electric power balance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is an engagement operation table illustrating a relationship between travel modes and combinations of operating states of a clutch and a brake which are used therein.

DETAILED DESCRIPTION OF EMBODIMENTS

Hereinafter, embodiments of the disclosure will be described in detail with reference to the accompanying drawings. In the following embodiments, the drawings are appropriately simplified or modified, and dimensional ratios, shapes, and the like of constituent elements are not necessarily accurate.

Figure 1:
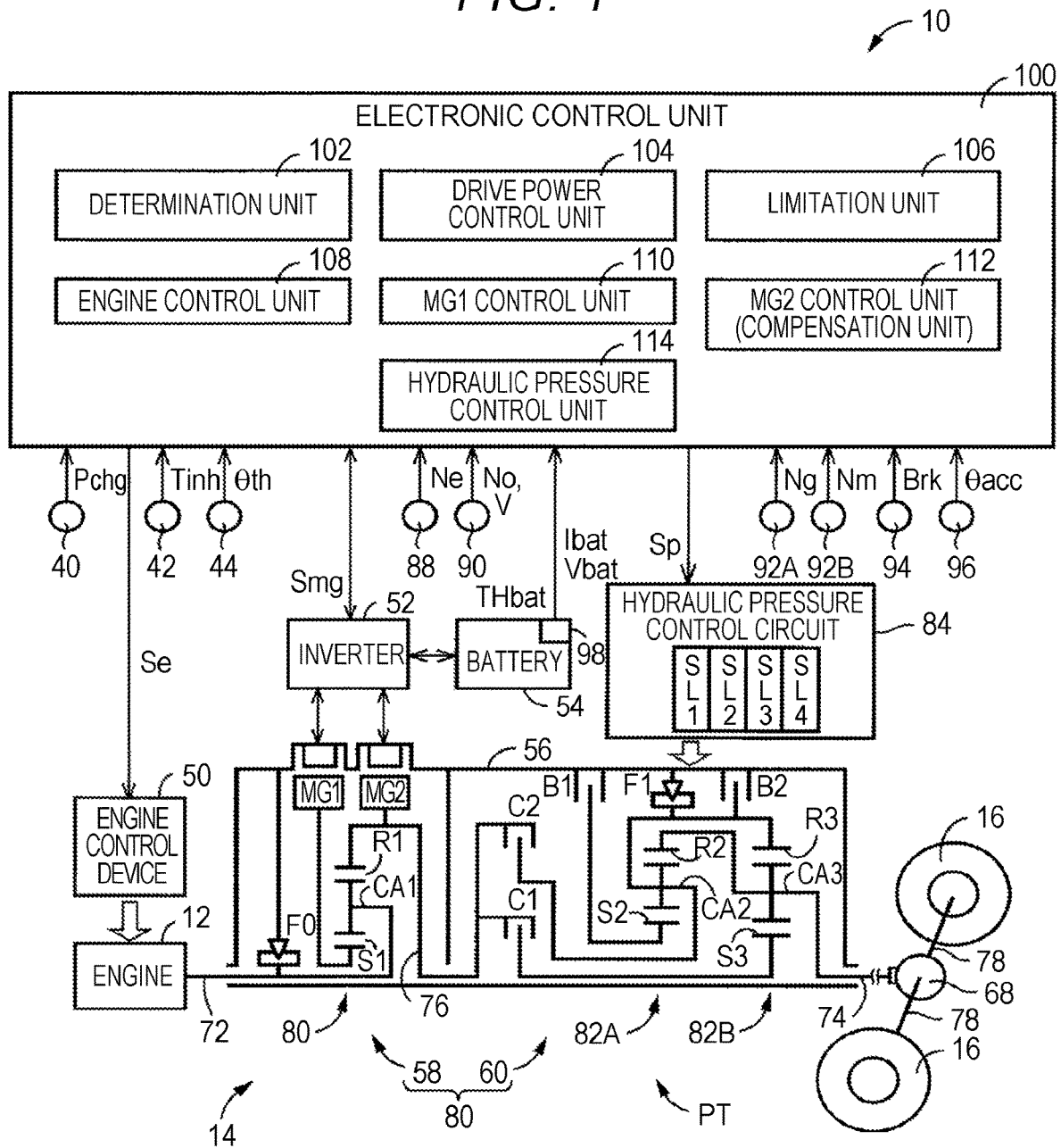
FIG. 1 is a functional block diagram schematically illustrating a configuration of a vehicle in which an electronic control unit according to a first embodiment of the disclosure is mounted and illustrating principal parts of a control function for various types of control in the vehicle.

FIG. 1 is a diagram schematically illustrating a configuration of a hybrid vehicle 10 in which an electronic control unit 100 according to a first embodiment of the disclosure is mounted and illustrating a principal part of a control function for various types of control in the hybrid vehicle 10. The hybrid vehicle 10 (hereinafter referred to as a "vehicle 10") includes an engine 12, a first rotary machine MG1, a second rotary machine MG2, a power transmission device 14, and driving wheels 16.

Figure 2:
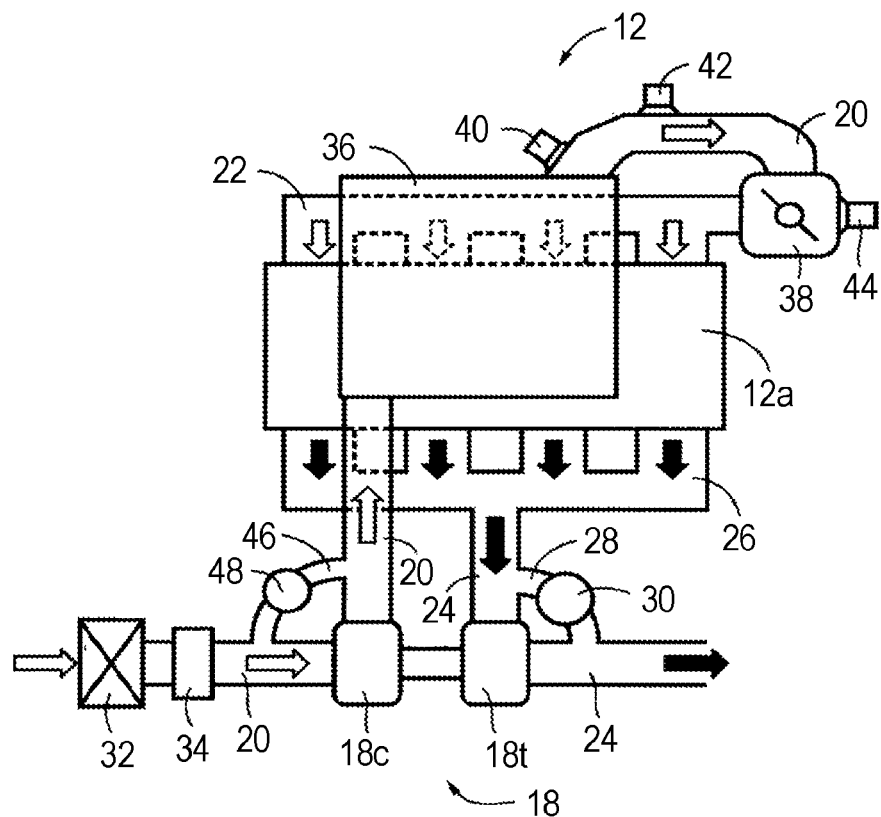
FIG. 2 is a diagram schematically illustrating a configuration of an engine illustrated in FIG. 1.

FIG. 2 is a diagram schematically illustrating a configuration of the engine 12 illustrated in FIG. 1. The engine 12 is a drive power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t. The compressor 18c is rotationally driven by the turbine 18t to compress air suctioned into the engine 12, that is, intake air.

An exhaust bypass 28 that causes exhaust gas to flow from upstream to downstream with respect to the turbine 18t by bypassing the turbine 18t is provided in the exhaust pipe 24. A waste gate valve 30 (hereinafter referred to as "WGV 30") that continuously controls a ratio of exhaust gas passing through the exhaust bypass 28 to exhaust gas passing through the turbine 18t is provided in the exhaust bypass 28. A valve opening of the WGV 30 is continuously adjusted by causing the electronic control unit 100 which will be described later to operate an actuator which is not illustrated. As the valve opening of the WGV 30 increases, exhaust gas of the engine 12 is more likely to be discharged via the exhaust bypass 28. Accordingly, in a supercharged state of the engine 12 in which a supercharging operation of the supercharger 18 works, a supercharging pressure Pchg [Pa] from the supercharger 18 decreases as the valve opening of the WGV 30 increases. The supercharging pressure Pchg from the supercharger 18 is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing an electronic control unit 100 which will be described later to operate a throttle actuator which is not illustrated is provided in the intake pipe 20 downstream from the intercooler 36 and upstream from the intake manifold 22. A supercharging pressure sensor 40 that detects a supercharging pressure Pchg downstream from the compressor 18c and an intake air temperature sensor 42 that detects an intake air temperature Tinh [° C.] which is the temperature of intake air are provided in the intake pipe 20 between the intercooler 36 and the electronic throttle valve 38. A throttle valve opening sensor 44 that detects a throttle valve opening θth [%] which is an opening of the electronic throttle valve 38 is provided in the vicinity of the electronic throttle valve 38, for example, in the throttle actuator.

An air recirculation bypass 46 that causes air to flow from downstream to upstream with respect to the compressor 18*c* by bypassing the compressor 18*c* is provided in the intake pipe 20. For example, an air bypass valve 48 that is opened to curb occurrence of a surge and to protect the compressor 18*c* at the time of sudden closing of the electronic throttle valve 38 is provided in the air recirculation bypass 46.

In the engine 12, an engine torque Te [Nm] which is output from the engine 12 is controlled by causing the electronic control unit 100 which will be described later to control an engine control device 50 (see FIG. 1) including the electronic throttle valve 38, a fuel injection device, an ignition device, and the WGV 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as drive power sources for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg [Nm] which is output from the first rotary machine MG1 and an MG2 torque Tm [Nm] which is output from the second rotary machine MG2 are controlled by causing the electronic control unit 100 which will be described later to control the inverter 52. For example, in the case of forward rotation, a torque which is output from a rotary machine is a powering torque at a positive torque which is an acceleration side and is a regenerative torque at a negative torque which is a deceleration side. When the MG1 torque Tg and the MG2 torque Tm which are output from the first rotary machine MG1 and the second rotary machine MG2 are powering torques, power which is output from the first rotary machine MG1 and the second rotary machine MG2 is drive power for travel. The battery 54 transmits and receives electric power to and from the first rotary machine MG1 and the second rotary machine MG2. The battery 54 is a chargeable/dischargeable secondary battery such as a lithium-ion battery pack or a nickel-hydride battery pack. The first rotary machine MG1 and the second rotary machine MG2 are provided in a case 56 which is a non-rotary member attached to the vehicle body. The battery 54 corresponds to a "power storage device" in the claims, and the MG2 torque Tm corresponds to a "torque of a second rotary machine" in the claims.

The power transmission device 14 includes an electrical stepless gear shifting unit 58 and a mechanical stepped gear shifting unit 60 which are disposed in series on a common axis in a case 56 which is a non-rotary member attached to the vehicle body. The stepless gear shifting unit 58 is connected to the engine 12 directly or indirectly via a damper or the like which is not illustrated. The stepped gear shifting unit 60 is connected to an output side of the stepless gear shifting unit 58. The power transmission device 14 includes a differential gear 68 that is connected to an output shaft 74 which is an output rotary member of the stepped gear shifting unit 60 and a pair of axles 78 that is connected to the differential gear 68. In the power transmission device 14, power which is output from the engine 12 or the second rotary machine MG2 is transmitted to the stepped gear shifting unit 60. The power transmitted to the stepped gear shifting unit 60 is transmitted to the driving wheels 16 via the differential gear 68 or the like. The power transmission device 14 having this configuration is suitably used for a vehicle of a front-engine rear-drive (FR) type. The stepless gear shifting unit 58, the stepped gear shifting unit 60, or the like is disposed to be substantially symmetric with respect to the common axis, and a lower half with respect to the axis is not illustrated in FIG. 1. The common axis is an axis of a crankshaft of the engine 12, an input shaft 72 connected to the crankshaft, or the like. The stepless gear shifting unit 58, the stepped gear shifting unit 60, the differential gear 68, and the axles 78 of the power transmission device 14 constitute the power transmission path PT which is provided between the engine 12 and the second rotary machine MG2 and the driving wheels 16. The stepped gear shifting unit 60 constitutes a part of the power transmission path PT between an intermediate transmission member 76 and the driving wheels 16.

The stepless gear shifting unit 58 includes a differential mechanism 80 which is a power split mechanism that mechanically splits power of the engine 12 to the first rotary machine MG1 and the intermediate transmission member 76 which is an output rotary member of the stepless gear shifting unit 58. The first rotary machine MG1 is a rotary machine to which the power of the engine 12 is transmitted. The second rotary machine MG2 is connected to the intermediate transmission member 76 in a power-transmittable manner. Since the intermediate transmission member 76 is connected to the driving wheels 16 via the stepped gear shifting unit 60, the second rotary machine MG2 is connected to the power transmission path PT in a power-transmittable manner and the second rotary machine MG2 is a rotary machine that is connected to the driving wheels 16 in a power-transmittable manner. The differential mechanism 80 is a differential mechanism that splits and transmits the power of the engine 12 to the driving wheels 16 and the first rotary machine MG1. The stepless gear shifting unit 58 is an electrical stepless transmission in which a differential state of the differential mechanism 80 (that is, a differential state of the stepless gear shifting unit 58) is controlled by controlling the operating state of the first rotary machine MG1 which is connected to the differential mechanism 80 in a power-transmittable manner. The first rotary machine MG1 is a rotary machine that can control an engine rotation speed Ne [rpm]. The engine rotation speed Ne is a rotation speed of the engine 12.

The differential mechanism 80 is a known single-pinion type planetary gear device including a sun gear S1, a carrier CA1, and a ring gear R1.

The stepped gear shifting unit 60 is a mechanical gear shifting mechanism which is a stepped transmission constituting a part of the power transmission path PT between the intermediate transmission member 76 and the driving wheels 16, that is, an automatic transmission constituting a part of the power transmission path PT between the differential mechanism 80 and the driving wheels 16. The intermediate transmission member 76 also serves as an input rotary member of the stepped gear shifting unit 60. The stepped gear shifting unit 60 is, for example, a known planetary gear type automatic transmission including a plurality of planetary gear units such as a first planetary gear unit 82A and a second planetary gear unit 82B and a plurality of engagement devices such as a clutch C1, a clutch C2, a brake B1, a brake B2, and a one-way clutch F1. In the following description, the clutch C1, the clutch C2, the brake B1, and the brake B2 are simply referred to as engagement devices CB when not particularly distinguished from each other. The intermediate transmission member 76 corresponds to an "AT input shaft" in the claims. Hereinafter, the intermediate transmission member 76 may be referred to as an AT input shaft 76.

Each engagement device CB is a hydraulic frictional engagement device which is constituted by a multi-disc or single-disc clutch or brake which is pressed by a hydraulic actuator, a band brake which is tightened by a hydraulic actuator, or the like. In each engagement device CB, the operating state such as an engaged state or a disengaged state thereof is switched according to adjusted hydraulic pressures which are output from a hydraulic pressure control circuit 84 by causing the electronic control unit 100 which will be described later to control the hydraulic pressure control circuit 84 which is provided in the vehicle 10.

The first planetary gear unit 82A is a known single-pinion type planetary gear unit that includes a sun gear S2, a carrier CA2, and a ring gear R2. The second planetary gear unit 82B is a known single-pinion type planetary gear unit that includes a sun gear S3, a carrier CA3, and a ring gear R3.

The differential mechanism 80, the first planetary gear unit 82A, the second planetary gear unit 82B, the engagement devices CB, the one-way clutch F1, the first rotary machine MG1, and the second rotary machine MG2 are connected as illustrated in FIG. 1.

In the differential mechanism 80, the engine 12 is connected to the carrier CA1 corresponding to a first rotary element RE1 in a power-transmittable manner, the first rotary machine MG1 is connected to the sun gear S1 corresponding to a second rotary element RE2 in a power-transmittable manner, and the intermediate transmission member 76 that can transmit power to the driving wheels 16 is connected to the ring gear R1 corresponding to a third rotary element RE3. In the differential mechanism 80, the carrier CA1 serves as an input element, the sun gear S1 serves as a reaction element, and the ring gear R1 serves as an output element. The intermediate transmission member 76 corresponds to a "transmission member" in the claims.

Each engagement device CB is a hydraulic frictional engagement device. In each engagement device CB, an engagement torque which is a torque capacity of the corresponding engagement device CB is changed according to adjusted hydraulic pressures which are output from solenoid valves SL1 to SL4 in the hydraulic pressure control circuit 84 provided in the vehicle 10. Accordingly, the operating state such as an engaged state or a disengaged state of each engagement device CB is switched.

In the stepped gear shifting unit 60, a certain gear stage out of a plurality of gear shifting stages with different gear ratios γat (=AT input rotation speed Nati [rpm]/AT output rotation speed Nato [rpm]) is formed, by switching a combination of the operating states of the plurality of engagement devices CB. In this embodiment, a gear stage which is formed in the stepped gear shifting unit 60 is referred to as an AT gear stage. The AT input rotation speed Nati is an input rotation speed of the stepped gear shifting unit 60 and has the same value as the rotation speed of the intermediate transmission member 76 (the AT input shaft 76) and the same value as an MG2 rotation speed Nm [rpm] which is a rotation speed of the second rotary machine MG2. The AT output rotation speed Nato is a rotation speed of the output shaft 74 which is an output rotary member of the stepped gear shifting unit 60 and is also an output rotation speed No [rpm] of a composite transmission 62 which is a combined transmission including the stepless gear shifting unit 58 and the stepped gear shifting unit 60.

Figure 3:
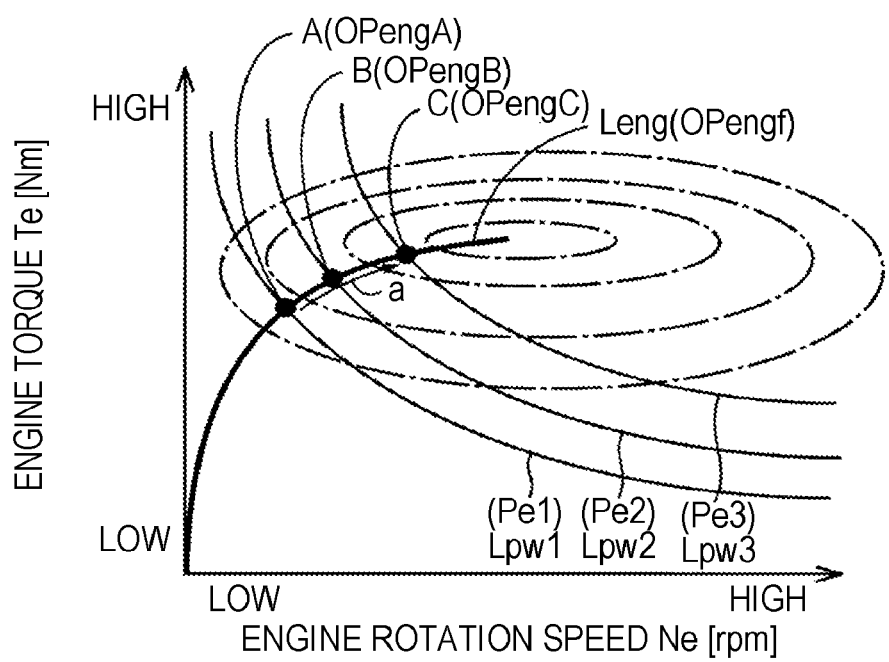
FIG. 3 is a diagram illustrating an example of an optimal engine operating point in a two-dimensional coordinate system with an engine rotation speed and an engine torque of the engine as variables.

FIG. 3 is a diagram illustrating an example of optimal engine operating points OPengf in a two-dimensional coordinate system with the engine rotation speed Ne and the engine torque Te as variables. In FIG. 3, a maximum efficiency line Leng denotes a group of optimal engine operating points OPengf when the engine 12 operates. An optimal engine operating point OPengf is predetermined as an engine operating point OPeng at which total fuel efficiency in the vehicle 10 is the best in consideration of charging/discharging efficiency in the battery 54 in addition to fuel efficiency of the engine 12 alone, for example, when required engine power Pedem [W] is realized. That is, the engine rotation speed Ne at an optimal engine operating point OPengf is an optimal fuel-efficiency rotation speed Neeff at which the engine 12 can most efficiently output the required engine power Pedem. A required drive power Pwdem [N] is calculated according to an accelerator opening θacc [%] or a vehicle speed V [km/h] based on a driver's operation of depressing an accelerator pedal which is not illustrated, and the required engine power Pedem of the engine 12 is calculated based on the required drive power Pwdem. A required engine torque Tedem [Nm] which is required by the driver is calculated based on the required engine power Pedem and the current engine rotation speed Ne.

Equi-engine-power lines Lpw1, Lpw2, and Lpw3 denote examples in which the required engine power Pedem is engine power Pe1, Pe2, and Pe3, respectively. A point A is an engine operating point OPengA when the engine power Pe1 is realized at the optimal engine operating point OPengf, a point B is an engine operating point OPengB when the engine power Pe2 is realized at the optimal engine operating point OPengf, and a point C is an engine operating point OPengC when the engine power Pe3 is realized at the optimal engine operating point OPengf. The points A, B, and C are also target values of the engine operating point OPeng which is expressed by a target engine rotation speed Netgt [rpm] and a target engine torque Tetgt [Nm], that is, a target engine operating point OPengtgt. That is, the target engine rotation speed Netgt is a target value of the engine rotation speed Ne and the target engine power Tetgt is a target value of the engine torque Te. Engine power Pe [W] is power which is output from the engine 12 and is drive power for travel which is output from the engine 12.

For example, when the target engine operating point OPengtgt changes from the point A to the point C with an increase in an accelerator opening θacc [%] (for example, an increase in the accelerator opening θacc in a force of depression of an accelerator pedal, which is not illustrated, by a driver), the engine operating point OPeng changes on a path a which passes over the maximum efficiency line Leng.

Although not illustrated in FIG. 3, the optimal engine operating points OPengf at which the fuel efficiency is the highest in the engine 12 with the supercharger 18 are stored in advance with a supercharging pressure Pchg in addition to the engine rotation speed Ne and the engine torque Te as variables. The supercharging pressure Pchg when the required engine power Pedem is realized at the optimal engine operating point OPengf is a target supercharging pressure Pchgtgt [Pa].

Figures 4, 5:
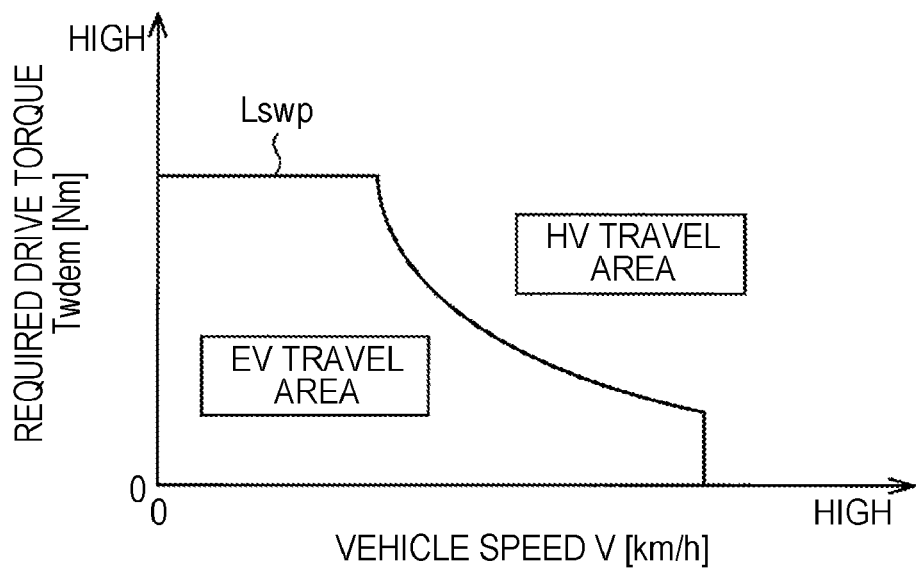
FIG. 4 is a diagram illustrating an example of a power source switching map which is used for switching control between EV travel and HV travel.
FIG. 5 is an engagement operation table illustrating a relationship between a gear shifting operation of a stepped gear shifting unit illustrated in FIG. 1 and a combination of operating states of engagement devices which are used therein.

FIG. 4 is a diagram illustrating an example of a power source switching map which is used for switching control between EV travel and HV travel. In FIG. 4, a solid line Lswp is a boundary line between an EV travel area and an HV travel area at which switching between the EV travel and the HV travel is performed. An area in which a vehicle speed V is relatively low and a required drive torque Twdem [Nm] is relatively low (that is, required drive power Pwdem is relatively small) is defined in advance in the EV travel area. An area in which the vehicle speed V is relatively high and the required drive torque Twdem is relatively high (that is, the required drive power Pwdem is relatively great) is defined in advance in the HV travel area. When an SOC value SOC [%] of the battery 54 which will be described later is less than a predetermined state value or when warming-up of the engine 12 is necessary, the EV travel area in FIG. 4 may be changed to the HV travel area. The predetermined state value is a predetermined threshold value for determining that the state of charge value SOC is a value at which the engine 12 needs to be forcibly started to charge the battery 54.

The first rotary machine MG1 and the second rotary machine MG2 are connected to the battery 54 provided in the vehicle 10 via an inverter 52 which is provided in the vehicle 10. The MG1 torque Tg of the first rotary machine MG1 and the MG2 torque Tm of the second rotary machine MG2 are controlled by causing the electronic control unit 100 which will be described later to control the inverter 52.

FIG. 5 is an engagement operation table illustrating a relationship between a gear shifting operation of the stepped gear shifting unit 60 illustrated in FIG. 1 and a combination of operating states of the engagement devices CB which are used therein In the stepped gear shifting unit 60, for example, four AT gear stages for forward movement including a first AT gear stage ("1st" in FIG. 5) to a fourth AT gear stage ("4th" in FIG. 5) are formed as a plurality of AT gear stages. The gear ratio γat of the first AT gear stage is the highest and the gear ratio γat becomes lower in higher AT gear stages. An AT gear stage for reverse movement ("Rev" in FIG. 5) is formed, for example, by engagement of the clutch C1 and engagement of the brake B2. That is, for example, the first AT gear stage is formed at the time of reverse travel as will be described later. In FIG. 5, "O" denotes engagement, "Δ" denotes engagement at the time of engine braking or at the time of coast downshift of the stepped gear shifting unit 60, and a blank denotes disengagement. A coast downshift is, for example, a downshift which is performed in a decelerating travel state with an accelerator turned off out of downshifts which are performed due to a decrease in the vehicle speed V during decelerating travel with the accelerator turned off (the accelerator opening θacc is 0 or substantially 0).

In the stepped gear shifting unit 60, for example, an AT gear stage which is formed according to the accelerator opening θacc which is an amount of operation of an accelerator by a driver, the vehicle speed V, or the like is switched, that is, a plurality of AT gear stages is selectively formed, by the electronic control unit 100 which will be described later. For example, in gear shifting control of the stepped gear shifting unit 60, so-called clutch-to-clutch gear shifting in which gear shifting is performed by switching one of the engagement devices CB, that is, gear shifting is performed by switching of the engagement devices CB between engagement and disengagement, is performed.

The vehicle 10 additionally includes a one-way clutch F0 (see FIG. 1). The one-way clutch F0 is a lock mechanism that can fix the carrier CA1 to be non-rotatable. That is, the one-way clutch F0 is a lock mechanism that can fix an input shaft 72 which is connected to the crankshaft of the engine 12 and which rotates integrally with the carrier CA1 to the case 56. In the one-way clutch F0, one member of two members that are rotatable relative to each other is integrally connected to the input shaft 72 and the other member is integrally connected to the case 56. The one-way clutch F0 idles in a positive rotating direction which is a rotating direction at the time of operation of the engine 12 and is automatically engaged in a negative rotating direction which is opposite to that at the time of operation of the engine 12. Accordingly, when the one-way clutch F0 idles, the engine 12 is rotatable relative to the case 56. On the other hand, when the one-way clutch F0 is engaged, the engine 12 is not rotatable relative to the case 56. That is, the engine 12 is fixed to the case 56 by engagement of the one-way clutch F0. In this way, the one-way clutch F0 permits rotation in the positive rotating direction of the carrier CA1 which is a rotating direction at the time of operation of the engine 12 and prohibits rotation in the negative rotating direction of the carrier CAL That is, the one-way clutch F0 is a lock mechanism that can permit rotation in the positive rotating direction of the engine 12 and prohibit rotation in the negative rotating direction of the engine 12.

Figure 6:
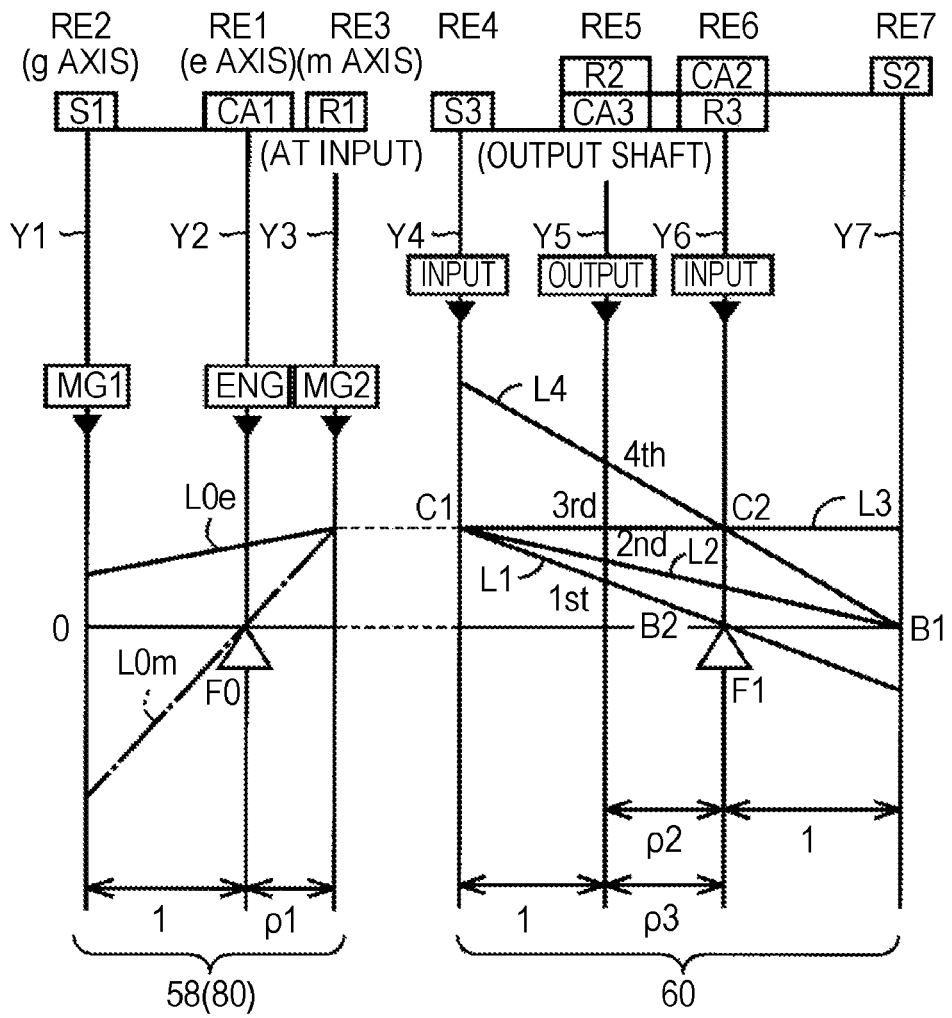
FIG. 6 is a collinear diagram illustrating a relative relationship between rotation speeds of rotary elements in a stepless gear shifting unit and a stepped gear shifting unit illustrated in FIG. 1.

FIG. 6 is a collinear diagram illustrating a relative relationship between rotation speeds of the rotary elements in the stepless gear shifting unit 58 and the stepped gear shifting unit 60 which are illustrated in FIG. 1. In FIG. 6, three vertical lines Y1, Y2, and Y3 corresponding to three rotary elements of the differential mechanism 80 constituting the stepless gear shifting unit 58 are a g axis indicating the rotation speed of the sun gear S1 corresponding to a second rotary element RE2, an e axis indicating the rotation speed of the carrier CA1 corresponding to a first rotary element RE1, and an m axis indicating the rotation speed of the ring gear R1 (that is, the input rotation speed Nati of the stepped gear shifting unit 60) corresponding to a third rotary element RE3, respectively, sequentially from the left. Four vertical lines Y4, Y5, Y6, and Y7 of the stepped gear shifting unit 60 are axes indicating the rotation speed of the sun gear S3 corresponding to a fourth rotary element RE4, the rotation speed of the ring gear R2 and the carrier CA3 (that is, the rotation speed of the output shaft 74) connected to each other and corresponding to a fifth rotary element RE5, the rotation speed of the carrier CA2 and the ring gear R3 connected to each other and corresponding to a sixth rotary element RE6, and the rotation speed of the sun gear S2 corresponding to a seventh rotary element RE7, respectively, sequentially from the left. The gaps between the vertical lines Y1, Y2, and Y3 are determined according to a gear ratio ρ1 of the differential mechanism 80 (=number of teeth of the sun gear S1/number of teeth of the ring gear R1). The gaps between the vertical lines Y4, Y5, Y6, and Y7 are determined according to gear ratios ρ2 (=number of teeth of the sun gear S2/number of teeth of the ring gear R2) and ρ3 (=number of teeth of the sun gear S3/number of teeth of the ring gear R3) of the first planetary gear unit 82A and the second planetary gear unit 82B.

Referring to the collinear diagram illustrated in FIG. 6, in the differential mechanism 80 of the stepless gear shifting unit 58, the engine 12 (see "ENG" in FIG. 6) is connected to the first rotary element RE1, the first rotary machine MG1 (see "MG1" in FIG. 6) is connected to the second rotary element RE2, the second rotary machine MG2 (see "MG2" in FIG. 6) is connected to the third rotary element RE3 which rotates integrally with the intermediate transmission member 76, and rotation of the engine 12 is transmitted to the stepped gear shifting unit 60 via the intermediate transmission member 76. In the stepless gear shifting unit 58, a relationship between the rotation speed of the sun gear S1 and the rotation speed of the ring gear R1 is represented by straight lines L0e and L0m crossing the vertical line Y2.

In the stepped gear shifting unit 60, the fourth rotary element RE4 is selectively connected to the intermediate transmission member 76 via the clutch C1, the fifth rotary element RE5 is connected to the output shaft 74, the sixth rotary element RE6 is selectively connected to the intermediate transmission member 76 via the clutch C2 and selectively connected to the case 56 via the brake B2, and the seventh rotary element RE7 is selectively connected to the case 56 via the brake B1. In the stepped gear shifting unit 60, the rotation speeds of "1st," "2nd," "3rd," and "4th" in the output shaft 74 are represented by the straight lines L1, L2, L3, and L4 crossing the vertical line Y5 through engagement/disengagement control of the engagement devices CB.

The straight line L0e and the straight lines L1, L2, L3, and L4 which are indicated by solid lines in FIG. 6 denote relative speeds of the rotary elements at the time of forward travel in an HV travel mode with at least the engine 12 as a drive power source for travel. In the HV travel mode, the engine 12 is a main drive power source for travel, and the first rotary machine MG1 and the second rotary machine MG2 are auxiliary drive power sources for travel according to necessity. In the HV travel mode, in the differential mechanism 80, when a reaction torque which is a negative torque of the first rotary machine MG1 with respect to the engine torque Te input to the carrier CA1 is input to the sun gear S1 at the time of positive rotation, a direct engine-transmitted torque Td [Nm] $(=Te/(1+\rho1)=-(1/\rho1)\times Tg)$ which is a positive torque at the time of positive rotation appears in the ring gear R1. A combined torque of the direct engine-transmitted torque Td and the MG2 torque Tm is transmitted as a drive torque Tw in the forward moving direction of the vehicle 10 to the driving wheels 16 via the stepped gear shifting unit 60 in which one AT gear stage out of the first AT gear stage to the fourth AT gear stage is formed according to required drive power Pwdem. At this time, the first rotary machine MG1 serves as a power generator that generates a negative torque at the time of positive rotation. Generated electric power Wg [W] of the first rotary machine MG1 is charged in the battery 54 or is consumed in the second rotary machine MG2. The second rotary machine MG2 outputs the MG2 torque Tm using all or some of the generated electric power Wg or electric power from the battery 54 in addition to the generated electric power Wg.

The straight line L0m indicated by an alternate long and short dash line in FIG. 6 and the straight lines L1, L2, L3, and L4 indicated by solid lines in FIG. 6 denote relative speeds of the rotary elements at the time of forward travel in an EV travel mode using at least one rotary machine of the first rotary machine MG1 and the second rotary machine MG2 as a drive power source for travel in a state in which the operation of the engine 12 is stopped. The forward travel in the EV travel mode includes, for example, a single-driven EV travel mode in which the engine 12 is not used as a drive power source for travel and only the second rotary machine MG2 is used as a drive power source for travel and a double-driven EV travel mode in which the engine 12 is not used as a drive power source for travel and both the first rotary machine MG1 and the second rotary machine MG2 are used as drive power sources for travel.

In the single-driven EV travel mode, the carrier CA1 does not rotate and the MG2 torque Tm which is a positive torque at the time of positive rotation is input to the ring gear R1. At this time, the first rotary machine MG1 connected to the sun gear S1 enters a no-load state and idles at the time of negative rotation. In the single-driven EV travel mode, the one-way clutch F0 is disengaged and the input shaft 72 is not fixed to the case 56.

In the double-driven EV travel mode, when the MG1 torque Tg which is a negative torque at the time of negative rotation is input to the sun gear S1 in a state in which the carrier CA1 does not rotate, the one-way clutch F0 is automatically engaged such that rotation in the negative rotating direction of the carrier CA1 is prohibited. In the state in which the carrier CA1 is fixed to be non-rotatable by engagement of the one-way clutch F0, a reaction torque based on the MG1 torque Tg is input to the ring gear R1. In the double-driven EV travel mode, similarly to the single-driven EV travel mode, the MG2 torque Tm is input to the ring gear R1.

At the time of forward travel in the single-driven EV travel mode and the double-driven EV travel mode, the engine 12 is not driven, the engine rotation speed Ne is zero, and at least one torque of the MG1 torque Tg and the MG2 torque Tm is transmitted to the driving wheels 16 via the stepped gear shifting unit 60 in which one AT gear stage out of the first AT gear stage to the fourth AT gear stage is formed as a drive torque Tw in the forward travel direction of the vehicle 10. At the time of forward travel in the single-driven EV travel mode and the double-driven EV travel mode, the engine 12 is not driven, the MG1 torque Tg is a powering torque which is a negative torque at the time of negative rotation and the MG2 torque Tm is a powering torque which is a positive torque at the time of positive rotation.

In the HV travel mode, when the required drive power Pwdem which is required for the vehicle 10 changes, the target engine operating point OPengtgt for acquiring required engine power Pedem for realizing the required drive power Pwdem is set.

In the HV travel mode, when the rotation speed of the sun gear S1 is increased or decreased by controlling the rotation speed of the first rotary machine MG1 with respect to the rotation speed of the ring gear R1 which is constrained to rotation of the driving wheels 16 with formation of an AT gear stage in the stepped gear shifting unit 60, the rotation speed of the carrier CA1, that is, the engine rotation speed Ne, is increased or decreased. Accordingly, in the HV travel mode, the engine 12 can operate at an engine operating point Peng with high efficiency. The composite transmission 62 including the stepped gear shifting unit 60 in which an AT gear stage is formed and the stepless gear shifting unit 58 operating as a stepless transmission can constitute a stepless transmission.

Referring back to FIG. 1, the vehicle 10 includes the electronic control unit 100 serving as a controller including the control device for the vehicle 10 associated with control of the engine 12, the first rotary machine MG1, the second rotary machine MG2, and the like. The electronic control unit 100 is configured to include a so-called microcomputer including, for example, a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity. The electronic control unit 100 corresponds to a "control device" in the claims.

The electronic control unit 100 is supplied with various signals (for example, a supercharging pressure Pchg, an intake air temperature Tinh, a throttle valve opening θth, an engine rotation speed Ne, an output rotation speed No which is the rotation speed of the output shaft 74 corresponding to a vehicle speed V, an MG1 rotation speed Ng [rpm] which is the rotation speed of the first rotary machine MG1, an MG2 rotation speed Nm which is the rotation speed of the second rotary machine MG2, an amount of brake operation Brk [%] indicating the magnitude of a braking operation by a driver, an accelerator opening θacc which is an accelerator operation amount indicating the magnitude of the driver's acceleration operation, and a battery temperature Thb [° C.], a battery charging/discharging current Ibat [mA], or a battery voltage Vbat [V] of the battery 54) based on detection values from various sensors (for example, a supercharging pressure sensor 40, an intake air temperature sensor 42, a throttle valve opening sensor 44, an engine rotation speed sensor 88, an output rotation speed sensor 90, an MG1 rotation speed sensor 92A, an MG2 rotation speed sensor 92B, a brake operation amount sensor 94, an accelerator opening sensor 96, and a battery sensor 98) which are provided in the vehicle 10.

The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sp for controlling the operating states of the engagement devices CB) to various devices (for example, the engine control device 50, the inverter 52, and the hydraulic pressure control circuit 84) which are provided in the vehicle 10.

The electronic control unit 100 calculates a state of charge value SOC which is a value indicating the state of charge of the battery 54, for example, based on the battery charging/discharging current Ibat and the battery voltage Vbat. The electronic control unit 100 calculates chargeable electric power Win [W] and dischargeable electric power Wout [W] for defining a feasible range of battery electric power Pbat [W] which is the power of the battery 54, for example, based on the battery temperature Thb and the state of charge value SOC of the battery 54. The chargeable electric power Win and the dischargeable electric power Wout are set to curb deterioration of the battery 54. The chargeable electric power Win is possible input electric power for defining a limitation of charging electric power of the battery 54 and the dischargeable electric power Wout is possible output power for defining a limitation of discharging electric power [W] of the battery 54. Accordingly, in view of deterioration of the battery 54, it is not preferable for the charging electric power of the battery 54 to exceed the chargeable electric power Win for a long time or for the discharging electric power of the battery 54 to exceed the dischargeable electric power Wout for a long time.

Figure 7:
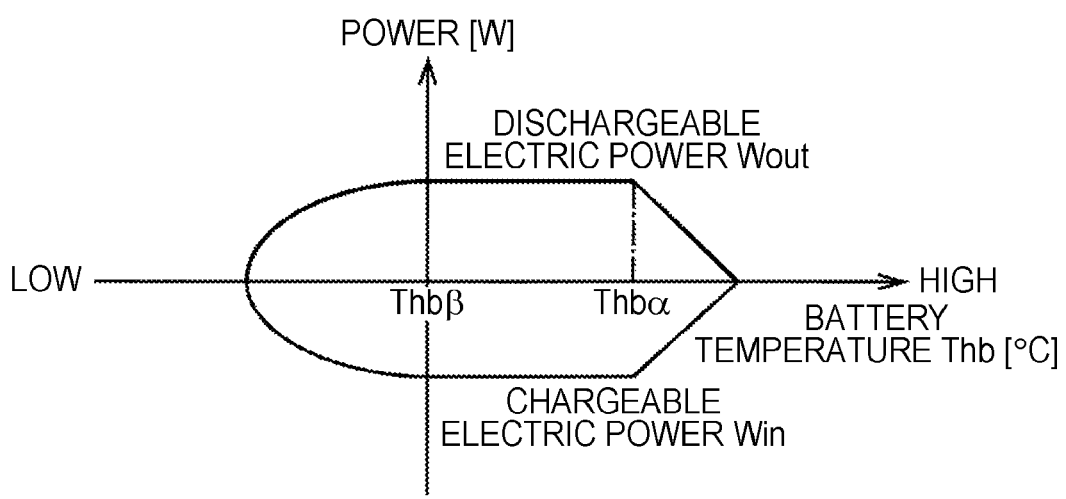
FIG. 7 is a diagram illustrating an example of chargeable and dischargeable electric power with respect to a battery temperature of a battery which is mounted in the vehicle illustrated in FIG. 1.

FIG. 7 illustrates an example of characteristics of the chargeable and dischargeable electric power Win and Wout with respect to the battery temperature Thb of the battery 54 which is mounted in the vehicle 10 illustrated in FIG. 1. The chargeable electric power Win and the dischargeable electric power Wout decrease as the battery temperature Thb decreases in a low-temperature area in which the battery temperature Thb is lower than that in a normal area (equal to or lower than a lower limit value Thbβ [° C.] of a normal temperature range), and decrease as the battery temperature Thb increases in a high-temperature area in which the battery temperature Thb is higher than that in the normal area (equal to or higher than an upper limit value Thbα [° C.] of the normal temperature range). For example, the chargeable electric power Win decreases as the state of charge value SOC increases in an area in which the state of charge value SOC is high. For example, the dischargeable electric power Wout decreases as the state of charge value SOC decreases in an area in which the state of charge value SOC is low. The chargeable and dischargeable electric power Win and Wout is an example of a limitation of the charging and discharging electric power of the battery 54. When the chargeable and dischargeable electric power Win and Wout is small, it means that the limitation of the charging and discharging electric power is greater than when the chargeable and dischargeable electric power Win and Wout is great.

The electronic control unit 100 functionally includes a determination unit 102, a drive power control unit 104, a limitation unit 106, an engine control unit 108, an MG1 control unit 110, an MG2 control unit 112, and a hydraulic pressure control unit 114.

Here, a rate of change Vchg [Pa/sec] is an amount of change of a supercharging pressure Pchg per unit time, that is, a rate of change of the supercharging pressure Pchg. A change rate limit value Vchglm [Pa/sec] is a limit value of the rate of change Vchg of the supercharging pressure. That is, the change rate limit value Vchglm is an upper limit of the rate of change Vchg of the supercharging pressure. When the change rate limit value Vchglm is small, it means that the limitation of the rate of change Vchg of the supercharging pressure is greater than that when the change rate limit value Vchglm is great, and the supercharging pressure Pchg changes relatively slowly. When the change rate limit value Vchglm is great, it means that the limitation of the rate of change Vchg of the supercharging pressure is smaller than that when the change rate limit value Vchglm is small, and the supercharging pressure Pchg changes relatively fast.

When it is determined that gear shifting control in the stepped gear shifting unit 60, for example, gear shifting control from a second AT gear stage to a third AT gear stage, is to be performed, the determination unit 102 determines whether charging and discharging electric power in the battery 54 is limited. For example, when the chargeable electric power Win is less than a predetermined first electric power value or when the dischargeable electric power Wout is less than a predetermined second electric power value, it is determined that the charging and discharging electric power is limited. The predetermined first electric power value and the predetermined second electric power value are set to determination values at which a charging/discharging electric power balance is less likely to be achieved due to unevenness in an actual engine torque Ter [Nm] based on a response delay of the supercharging pressure Pchg by experiment or design in advance. The actual engine torque Ter is an engine torque Te which is actually output from the engine 12.

When the determination unit 102 determines that the charging and discharging electric power in the battery 54 is limited, the drive power control unit 104 calculates, for example, an electric power balance target value ΔPaim [W] during gear shifting control using relationships which are represented by Expression (1) and FIG. 7.

The drive power control unit 104 determines the chargeable electric power Win and the dischargeable electric power Wout based on the battery temperature Thb, for example, using the relationship which is illustrated in FIG. 7 and which is stored in advance, and calculates the electric power balance target value ΔPaim based on the chargeable electric power Win and the dischargeable electric power Wout using Expression (1). In Expression (1), Amd [W] denotes a correction value for correcting a basic value [(Wout+Win)/2] and is set based on the travel state of the vehicle 10, the state of charge value SOC of the battery 54, or the like. For example, when the chargeable electric power Win (the lower limit) is −30,000 [W] and the dischargeable electric power Wout (the upper limit) is 30,000 [W], the electric power balance target value ΔPaim is zero (±0 [W]) which is a median value (average value) therebetween at the correction value Amd of 0. However, when there is a charging request for the battery 54, the correction value Amd is set to, for example, 5,000 [W] and the electric power balance target value ΔPaim is calculated to be 5,000 [W]. When there is a discharging request for the battery 54, the correction value Amd is set to, for example, −5,000 [W] and the electric power balance target value ΔPaim is calculated to be −5,000 [W].

In general, a fluctuation of the charging/discharging electric power balance during actual gear shifting control has a fluctuation width on a charging side (+ side) or a discharging side (− side), and this fluctuation width has a characteristic that it is biased to any one side. Accordingly, the correction value Amd is appropriately determined according to the bias of the fluctuation of the charging/discharging electric power balance which is predicted during gear shifting control, particularly, in an inertia phase. Since the bias characteristic of the fluctuation of the charging/discharging electric power balance is associated with the AT gear stage which is actually shifted, the vehicle speed V, the accelerator opening θacc, and a road surface gradient, the correction value Amd is determined based on the AT gear stage which is actually shifted, the vehicle speed V, the accelerator opening θacc, and the road surface gradient using a relationship which is experimentally acquired and stored in advance. In this relationship, the correction value Amd increases as the bias of the fluctuation of the charging/discharging electric power balance increases, and a value opposite to the side to which the correction value Amd is biased is acquired. For example, when the bias is on the charging side (+ side), the correction value Amd is determined to have a value on the discharging side (− side). The correction value Amd may be a coefficient which is equal to or less than 1 and which is multiplied by [(Wout+Win)/2].

On the other hand, when the determination unit 102 determines that the chargeable and dischargeable electric power Win and Wout is not limited, for example, the drive power control unit 104 calculates the electric power balance target value ΔPaim associated with the first rotary machine MG1 and the second rotary machine MG2 without using the relationship which is represented by Expression (1) and FIG. 7.

$$\Delta Paim=[(Wout+Win)/2]+Amd \quad (1)$$

When the electric power balance target value ΔPaim is calculated, the drive power control unit 104 starts gear shifting control. A control function of the electronic control unit 100 during gear shifting control will be described below.

The drive power control unit 104 sequentially calculates target values of the rotation speed change rates dω/dt [rad/sec$^2$] of the rotary elements RE1, RE2, and RE3 of the differential mechanism 80 (rotation speed change rates dωg/dt [rad/sec$^2$], dωe/dt [rad/sec$^2$], and dωm/dt [rad/sec$^2$] which will be described later and which are referred to as "rotation speed change rates dω/dt" when not particularly distinguished) during gear shifting control based on the calculated electric power balance target value ΔPaim. That is, the drive power control unit 104 calculates target values which are control aim values of the rotation speed change rate dωg/dt of the sun gear S1 (the first rotary machine MG1), the rotation speed change rate dωe/dt of the carrier CA1 (the engine 12), and the rotation speed change rate dωm/dt of the ring gear R1 (the second rotary machine MG2). The rotation speed change rates dωg/dt, dωe/dt, and dωm/dt are respectively amounts of change per unit time, that is, rates of change, of the rotation speed ωg [rad/sec] of the sun gear S1, the rotation speed ωe [rad/sec] of the carrier CA1, and the rotation speed ωm [rad/sec] of the ring gear R1. The rotation speed change rate dωe/dt [rad/sec$^2$] has the same value as acquired by multiplying the rotation speed change rate dNe/dt [rpm/sec] of the engine rotation speed Ne by 2π/60, and the rotation speed change rate dωm/dt [rad/sec$^2$] has the same value as acquired by multiplying the rotation speed change rate dNati/dt [rpm/sec] of the AT input rotation speed Nati by 2π/60.

Specifically, when shift of an engine operating point and gear shifting control of the stepped gear shifting unit 60 are simultaneously performed, control is performed such that a ratio of the rotation speed change rates dω/dt of the first rotary element RE1, the second rotary element RE2, and the third rotary element RE3 is equal to a ratio of differences between the actual rotation speeds to the target rotation speeds (an amount of change of the rotation speeds) at the current time point or a ratio of values which are calculated similarly thereto in at least a predetermined period of the gear shifting control. That is, the drive power control unit 104 calculates the target values of the rotation speed change rates dω/dt in the rotary elements RE1, RE2, and RE3 such that the difference ratio Δωg:Δωe:Δωm in the rotary elements RE1, RE2, and RE3 is equal to the rotation speed change rate ratio dωg/dt:dωe/dt:dωm/dt. That is, the target values of the rotation speed change rates dω/dt in the rotary elements RE1, RE2, and RE3 are calculated such that gear shifting progress levels (change states) in the first rotary element RE1, the second rotary element RE2, and the third rotary element RE3 are the same.

More specifically, when the difference ratio in the rotary elements RE1, RE2, and RE3 is expressed by Expression (2), the rotation speed change rate ratio in the rotary elements RE1, RE2, and RE3 is controlled such that Expression (3) is satisfied. That is, the drive power control unit 104 sequentially calculates the target values of the rotation speed change rates dω/dt in the rotary elements RE1, RE2, and RE3 such that Expression (4) is satisfied.

$$\Delta \varphi_g : \Delta \omega_e : \Delta \omega_m = 1 : \alpha : \beta \quad (2)$$

$$\dot{\omega}_g : \dot{\omega}_e : \dot{\omega}_m = 1 : \alpha : \beta \quad (3)$$

$$\Delta \omega_g : \Delta \omega_e : \Delta \omega_m = \dot{\omega}g : \dot{\omega}e : \dot{\omega}m \quad (4)$$

The drive power control unit 104 acquires the actual engine torque Ter at the current time point. For example, the actual engine torque Ter is calculated based on the actual engine rotation speed Ne and a throttle valve opening θth of the electronic throttle valve 38 which is not illustrated using a relationship which is stored in advance (an engine torque map). For example, the actual engine torque Ter may be detected by a torque sensor or the like.

The drive power control unit 104 acquires clutch torque values Tb1 and Tc2 of the engagement devices CB of the stepped gear shifting unit 60, for example, the brake B1 and the clutch C2, at the current time point. For example, the clutch torque values Tb1 and Tc2 are calculated based on the hydraulic pressure command values for the brake B1 and the clutch C2 (the output pressure command values of the solenoid valves SL1 to SL4 in the hydraulic pressure control circuit 84) at the current time point using a relationship (engagement torque characteristics) which is stored in advance. The drive power control unit 104 acquires a clutch torque value Tcb which is converted onto an m axis as a sum value of the clutch torque values Tb1 and Tc2. For example, actual hydraulic pressures of working oils supplied to the brake B1 and the clutch C2 may be detected by a hydraulic pressure sensor provided in the hydraulic pressure control circuit 84.

The drive power control unit 104 calculates the target values of the rotation speed change rates $d\omega/dt$ in the rotary elements RE1, RE2, and RE3 based on Expressions (2) to (4) using the engine power Pe during gear shifting control, clutch power of the engagement devices CB of the stepped gear shifting unit 60 (for example, transmitted drive power from the brake B1 and the clutch C2), the electric power balance target value $\Delta$Paim associated with the first rotary machine MG1 and the second rotary machine MG2, and balance calculation based on inertial power.

The drive power control unit 104 sequentially calculates the rotation speed change rates $d\omega/dt$ of the rotary elements RE1, RE2, and RE3, for example, satisfying Expression (4) and satisfying Expression (5). On the lower left side of Expression (5), $T_e \cdot \omega_e$ of the first term corresponds to the engine power, $T_{cb} \cdot \omega_m$ of the second term corresponds to the transmitted drive power in the engagement devices CB (that is, power which is consumed by a drive system), and $I_g \cdot d\omega_g/dt \cdot \omega_g + I_e \cdot d\omega_e/dt \cdot \omega_e + I_m \cdot d\omega_m/dt \cdot \omega_m$ of the third term corresponds to an increase in inertia of the rotary elements RE1, RE2, and RE3. For example, the clutch torque value Tcb corresponds to a clutch torque of the engagement devices CB associated with gear shifting in the stepped gear shifting unit 60, and is a sum torque of the clutch torque value Tb1 of the brake B1 and the clutch torque value Tc2 of the clutch C2 in gear shifting control (during gear shifting) which is converted on the m axis. Accordingly, the transmitted drive power of the brake B1 and the clutch C2 is clutch power which is transmitted from the stepped gear shifting unit 60 to the driving wheels 16 by the clutch torque value Tcb of the brake B1 and the clutch C2, and is transmitted drive power in the stepped gear shifting unit 60 corresponding to output power which is transmitted to the driving wheels 16 by the stepped gear shifting unit 60, that is, power which is transmitted to the driving wheels 16 via the stepped gear shifting unit 60. Since the lower right side of Expression (5) denotes the electric power balance target value $\Delta$Paim, the drive power control unit 104 sequentially calculates the target values of the rotation speed change rates $d\omega/dt$ of the first rotary element RE1, the second rotary element RE2, and the third rotary element RE3 for acquiring the electric power balance target value $\Delta$Paim.

$$T_e \cdot \omega_e - T_{cb} \cdot \omega_m - I_g \cdot \omega_g \cdot \dot{\omega}_g - I_e \cdot \omega_e \cdot \dot{\omega}_e - I_m \cdot \omega_m \cdot \dot{\omega}_m = T_e \cdot \omega_e - T_{cb} \cdot \omega_m - (I_g \cdot \omega_g \cdot \dot{\omega}_g + I_e \cdot \omega_e \cdot \dot{\omega}_e + I_m \cdot \omega_m \cdot \dot{\omega}_m) = \Delta P_{aim} \quad (5)$$

The drive power control unit 104 sequentially calculates the torques of the first rotary machine MG1 and the second rotary machine MG2 for realizing the calculated target values of the rotation speed change rates $d\omega/dt$ of the rotary elements RE1, RE2, and RE3. For example, the MG1 torque tg and the MG2 torque Tm satisfying an equation of motion represented by Expression (6) are calculated based on the calculated target value of the rotation speed change rate $d\omega_g/dt$ of the second rotary element RE2 (the first rotary machine MG1), the calculated target value of the rotation speed change rate $d\omega_e/dt$ of the first rotary element RE1 (the engine 12), the calculated target value of the rotation speed change rate $d\omega_m/dt$ of the third rotary element RE3 (the second rotary machine MG2), the actual engine torque Ter at the current time point, and the clutch torque value Tcb at the current time point (a converted value on the m axis).

$$\left. \begin{array}{l} \dot{\omega}_e(t) = keg \cdot T_g(t) + kee \cdot T_e(t) + kem \cdot T_m(t) + keb \cdot T_{cb} \\ \dot{\omega}_g(t) = kgg \cdot T_g(t) + kge \cdot T_e(t) + kgm \cdot T_m(t) + kgb \cdot T_{cb} \\ \dot{\omega}_m(t) = kmg \cdot T_g(t) + kme \cdot T_e(t) + kmm \cdot T_m(t) + kmb \cdot T_{cb} \end{array} \right\} \quad (6)$$

When the MG1 torque Tg and the MG2 torque Tm are calculated, the drive power control unit 104 performs gear shifting control such that the charging/discharging electric power balance of the battery 54 reaches the electric power balance target value $\Delta$Paim by controlling the engine control unit 108, the MG1 control unit 110, the MG2 control unit 112, and the hydraulic pressure control unit 114. Specifically, the engine control unit 108 controls the engine 12, the MG1 control unit 110 controls the first rotary machine MG1 such that the MG1 torque Tg which is sequentially calculated is realized, the MG2 control unit 112 controls the second rotary machine MG2 such that the MG2 torque Tm which is sequentially calculated is realized, and the hydraulic pressure control unit 114 controls the operating states of the engagement devices CB in the stepped gear shifting unit 60. As a result, the actual charging/discharging electric power balance in gear shifting control converges on the electric power balance target value $\Delta$Paim. In this way, the drive power control unit 104 performs gear shifting control such that the charging/discharging electric power balance of the battery 54 reaches the electric power balance target value $\Delta$Paim using the engine control unit 108, the MG1 control unit 110, the MG2 control unit 112, and the hydraulic pressure control unit 114.

The drive power control unit 104 determines whether gear shifting control has ended. When it is determined that the gear shifting control has not ended, the drive power control unit 104 sequentially calculates the target value of the rotation speed change rate $d\omega/dt$ in the differential mechanism 80 and the torques of the first rotary machine MG1 and the second rotary machine MG2 and continues to perform gear shifting control such that the charging/discharging electric power balance of the battery 54 reaches the electric power balance target value $\Delta$Paim.

When a response delay of the supercharging pressure Pchg (a change with time of the supercharging pressure Pchg) occurs in the engine 12 with the supercharger 18, unevenness in the actual engine torque Ter may occur with the lapse of time. When unevenness in the actual engine torque Ter occurs, the charging/discharging electric power balance of the battery 54 is less likely to be achieved. Particularly, when the chargeable and dischargeable electric power Win and Wout of the battery 54 is limited, the charging/discharging electric power balance is less likely to be achieved due to unevenness in the actual engine torque Ter based on the response delay of the supercharging pressure Pchg. Unevenness in the actual engine torque Ter due to the response delay of the supercharging pressure Pchg is less likely to occur due to the limitation of the rate of change Vchg of the supercharging pressure, and the charging/discharging electric power balance is likely to be achieved even when the chargeable and dischargeable electric power Win and Wout of the battery 54 is limited.

When the determination unit 102 determines that the chargeable and dischargeable electric power Win and Wout is limited, the limitation unit 106 calculates the change rate limit value Vchglm of the supercharging pressure Pchg based on the chargeable and dischargeable electric power Win and Wout during gear shifting control, the rotation speed change rate dNg/dt of the first rotary machine MG1, the rotation speed change rate dNati/dt of the AT input shaft 76 of the stepped gear shifting unit 60, and a supercharging response delay.

Figure 8:
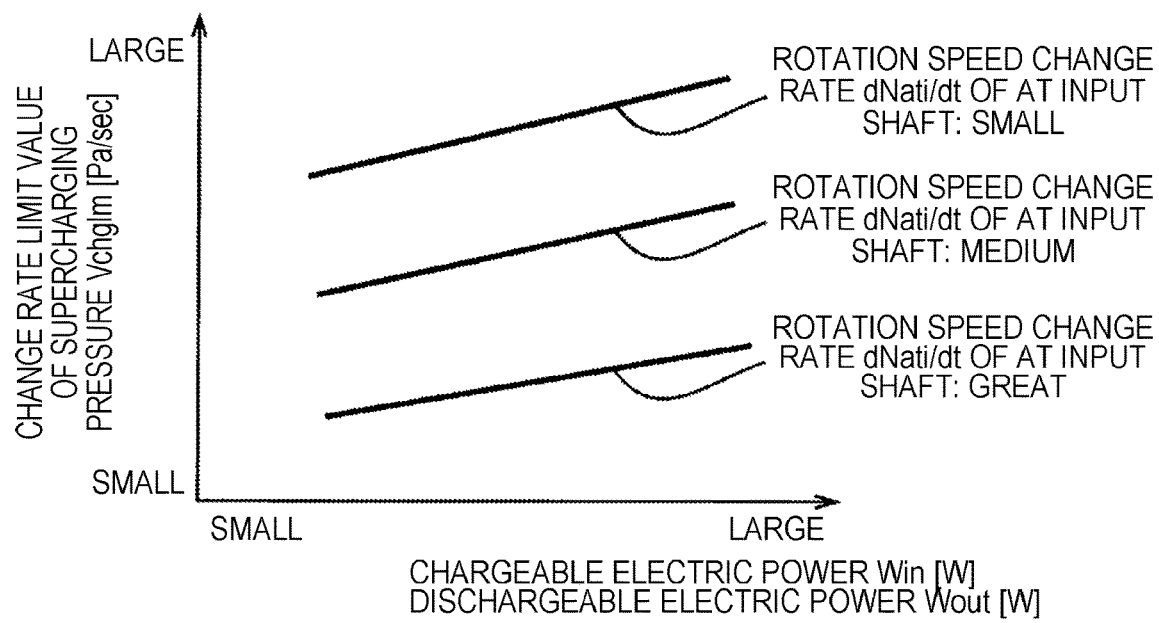
FIG. 8 is a diagram illustrating a relationship between a rate of change of a rotation speed of an AT input shaft of the stepped gear shifting unit and chargeable and dischargeable electric power in gear shifting control with respect to a change rate limit value for a supercharging pressure.

FIG. 8 is a diagram illustrating a relationship between a rotation speed change rate dNati/dt (=rotation speed change rate dωm/dt×60/2π) of the AT input shaft 76 of the stepped gear shifting unit 60 and the chargeable and dischargeable electric power Win and Wout in gear shifting control with respect to the change rate limit value Vchglm of the supercharging pressure Pchg. The rotation speed change rate dNati/dt of the AT input shaft 76 of the stepped gear shifting unit 60 during gear shifting control is an amount of change per unit time, that is, a rate of change, of the AT input rotation speed Nati.

When the chargeable and dischargeable electric power Win and Wout is small, a smaller value is calculated as the change rate limit value Vchglm than when the chargeable and dischargeable electric power Win and Wont is great. That is, when the limitation of the charging and discharging electric power is great, the limitation of the rate of change Vchg of the supercharging pressure is greater than when the limitation of the charging and discharging electric power is small. This means that, when conditions other than the chargeable and dischargeable electric power Win and Wout are the same (for example, when the rotation speed change rate dNati/dt during gear shifting control is the same in FIG. 8), a smaller value is calculated as the change rate limit value Vchglm when the chargeable and dischargeable electric power Win and Wout is small than when the chargeable and dischargeable electric power Win and Wout is great, but does not mean that, when conditions other than the chargeable and dischargeable electric powers Win and Wout are different, a smaller value is calculated as the change rate limit value Vchglm when the chargeable and dischargeable electric power Win and Wout is small than when the chargeable and dischargeable electric power Win and Wout is great.

When the rotation speed change rate dNati/dt during gear shifting control is great, a smaller value is calculated as the change rate limit value Vchglm than when the rotation speed change rate dNati/dt is small. That is, when the rotation speed change rate dNati/dt is great, the limitation of the rate of change Vchg of the supercharging pressure is greater than when the rotation speed change rate dNati/dt is small. This means that, when conditions other than the rotation speed change rate dNati/dt during gear shifting control are the same (for example, when the chargeable and dischargeable electric power Win and Wout is the same in FIG. 8), a smaller value is calculated as the change rate limit value Vchglm when the rotation speed change rate dNati/dt is great than when the rotation speed change rate dNati/dt is small, but does not mean that, when conditions other than the rotation speed change rate dNati/dt during gear shifting control are different, a smaller value is calculated as the change rate limit value Vchglm when the rotation speed change rate dNati/dt during gear shifting control is great than when the rotation speed change rate dNati/dt is small.

Figure 9:
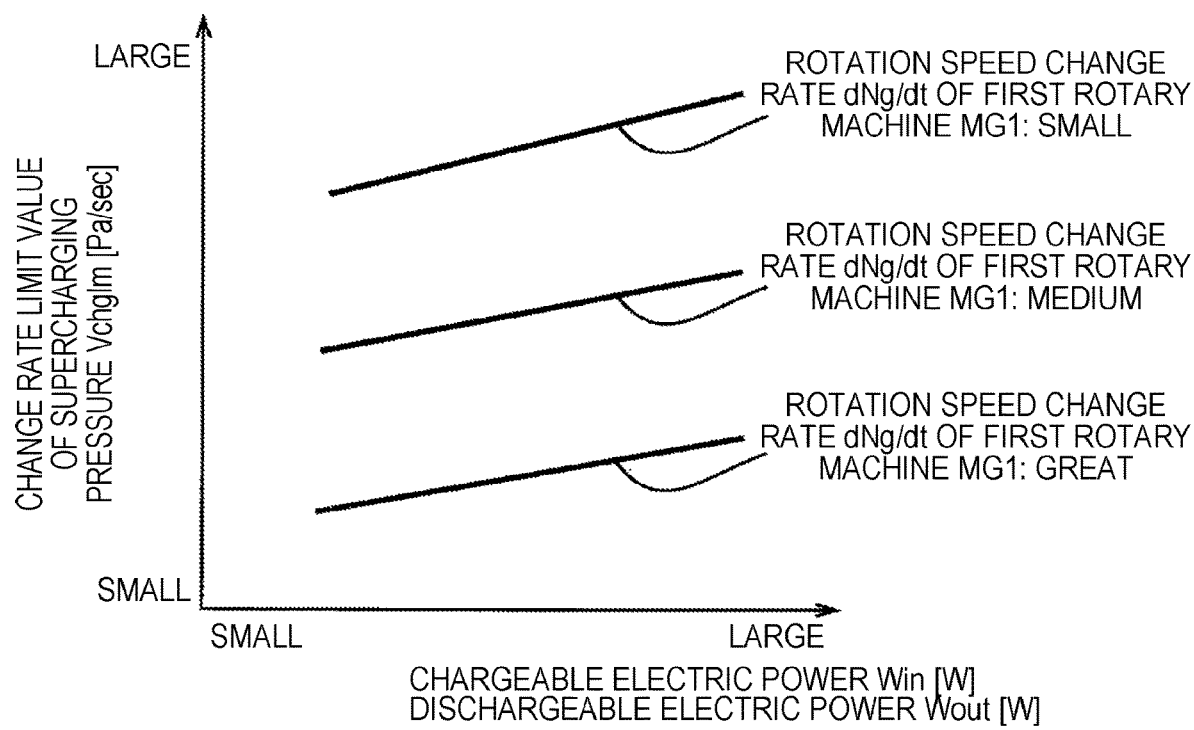
FIG. 9 is a diagram illustrating a relationship between a rate of change of a rotation speed of a first rotary machine and chargeable and dischargeable electric power in gear shifting control with respect to a change rate limit value for a supercharging pressure.

FIG. 9 is a diagram illustrating a relationship between a rotation speed change rate dNg/dt [rpm/sec] (=rotation speed change rate dωg/dt×60/2π) of the first rotary machine MG1 and the chargeable and dischargeable electric power Win and Wout in gear shifting control with respect to the change rate limit value Vchglm of the supercharging pressure Pchg. The rotation speed change rate dNg/dt of the first rotary machine MG1 during gear shifting control is an amount of change per unit time, that is, a rate of change, of the MG1 rotation speed Ng. As described above with reference to FIG. 8, when the chargeable and dischargeable electric power Win and Wout is small, a smaller value is calculated as the change rate limit value Vchglm than when the chargeable and dischargeable electric power Win and Wout is great.

When the rotation speed change rate dNg/dt during gear shifting control is great, a smaller value is calculated as the change rate limit value Vchglm than when the rotation speed change rate dNg/dt is small. That is, when the rotation speed change rate dNg/dt is great, the limitation of the rate of change Vchg of the supercharging pressure is greater than when the rotation speed change rate dNg/dt is small. This means that, when conditions other than the rotation speed change rate dNg/dt during gear shifting control are the same (for example, when the chargeable and dischargeable electric power Win and Wout is the same in FIG. 9), a smaller value is calculated as the change rate limit value Vchglm when the rotation speed change rate dNg/dt is great than when the rotation speed change rate dNg/dt is small, but does not mean that, when conditions other than the rotation speed change rate dNg/dt during gear shifting control are different, a smaller value is calculated as the change rate limit value Vchglm when the rotation speed change rate dNg/dt during gear shifting control is great than when the rotation speed change rate dNg/dt is small.

Figure 10:
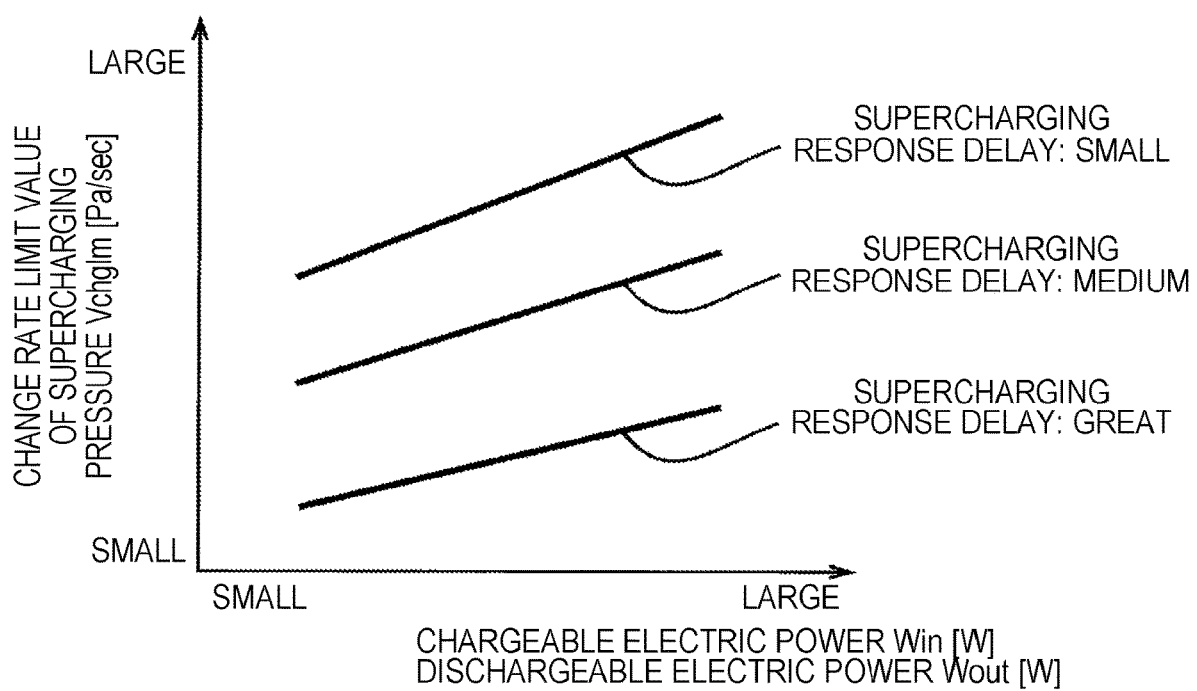
FIG. 10 is a diagram illustrating a relationship between a supercharging response delay and chargeable and dischargeable electric power in gear shifting control with respect to a change rate limit value for a supercharging pressure.

FIG. 10 is a diagram illustrating a relationship between a supercharging response delay and the chargeable and dischargeable electric power Win and Wout in gear shifting control with respect to the change rate limit value Vchglm of the supercharging pressure Pchg. The supercharging response delay during gear shifting control means that a response of the supercharging pressure Pchg during gear shifting control (a temporal response until a supercharging operation including a so-called turbo lag works) lags. For example, when the engine rotation speed Ne is low, the supercharging response delay during gear shifting control is greater than when the engine rotation speed Ne is high. When the intake air temperature Tinh is high, the supercharging response delay during gear shifting control is greater than when the intake air temperature is low. As described above with reference to FIG. 8, when the chargeable and dischargeable electric power Win and Wout is small, a smaller value is calculated as the change rate limit value Vchglm than when the chargeable and dischargeable electric power Win and Wout is great.

When the supercharging response delay during gear shifting control is great (for example, when the engine rotation speed Ne is low or the intake air temperature Tinh is high), a smaller value is calculated as the change rate limit value Vchglm than when the supercharging response delay is small (for example, when the engine rotation speed Ne is high or the intake air temperature Tinh is low). That is, when the supercharging response delay is great, the limitation of the rate of change Vchg of the supercharging pressure is greater than when the supercharging response delay is small. This means that, when conditions other than the supercharging response delay during gear shifting control are the same (for example, when the chargeable and dischargeable electric power Win and Wout is the same in FIG. 10), a smaller value is calculated as the change rate limit value Vchglm when the supercharging response delay is great than when the supercharging response delay is small, but does not mean that, when conditions other than the supercharging response delay during gear shifting control are different, a smaller value is calculated as the change rate limit value Vchglm when the supercharging response delay during gear shifting control is great when the supercharging response delay is small.

As described above with reference to FIGS. 8 to 10, the limitation unit 106 calculates the change rate limit value Vchglm of the supercharging pressure Pchg based on the chargeable and dischargeable electric power Win and Wout, the rotation speed change rate dNg/dt of the first rotary machine MG1, the rotation speed change rate dNati/dt, and the supercharging response delay during gear shifting control (that is, with these as variables). The limitation unit 106 applies the calculated change rate limit value Vchglm during gear shifting control.

When the limitation unit 106 applies the change rate limit value Vchglm during gear shifting control, the engine 12 is controlled in a state in which the rate of change Vchg of the supercharging pressure is limited such that the change rate limit value Vchglm is not exceeded. The limitation of the rate of change Vchg of the supercharging pressure is performed, for example, by adjusting the valve opening of the WGV 30. When the rate of change Vchg of the supercharging pressure is limited not to exceed the change rate limit value Vchglm, the MG2 control unit 112 performs control such that unevenness in torque which is output to the intermediate transmission member 76 based on a difference ΔTe between the required engine torque Tedem [Nm] and the actual engine torque Ter due to the limitation of the rate of change Vchg of the supercharging pressure is compensated for using the MG2 torque Tm of the second rotary machine MG2. In this way, the MG2 control unit 112 serves as a compensation unit that compensates for unevenness of the torque output to the intermediate transmission member 76 based on the difference ΔTe between the required engine torque Tedem [Nm] and the actual engine torque Ter due to the limitation of the rate of change Vchg of the supercharging pressure. The MG2 control unit 112 corresponds to a "compensation unit" in the claims.

Figure 11:
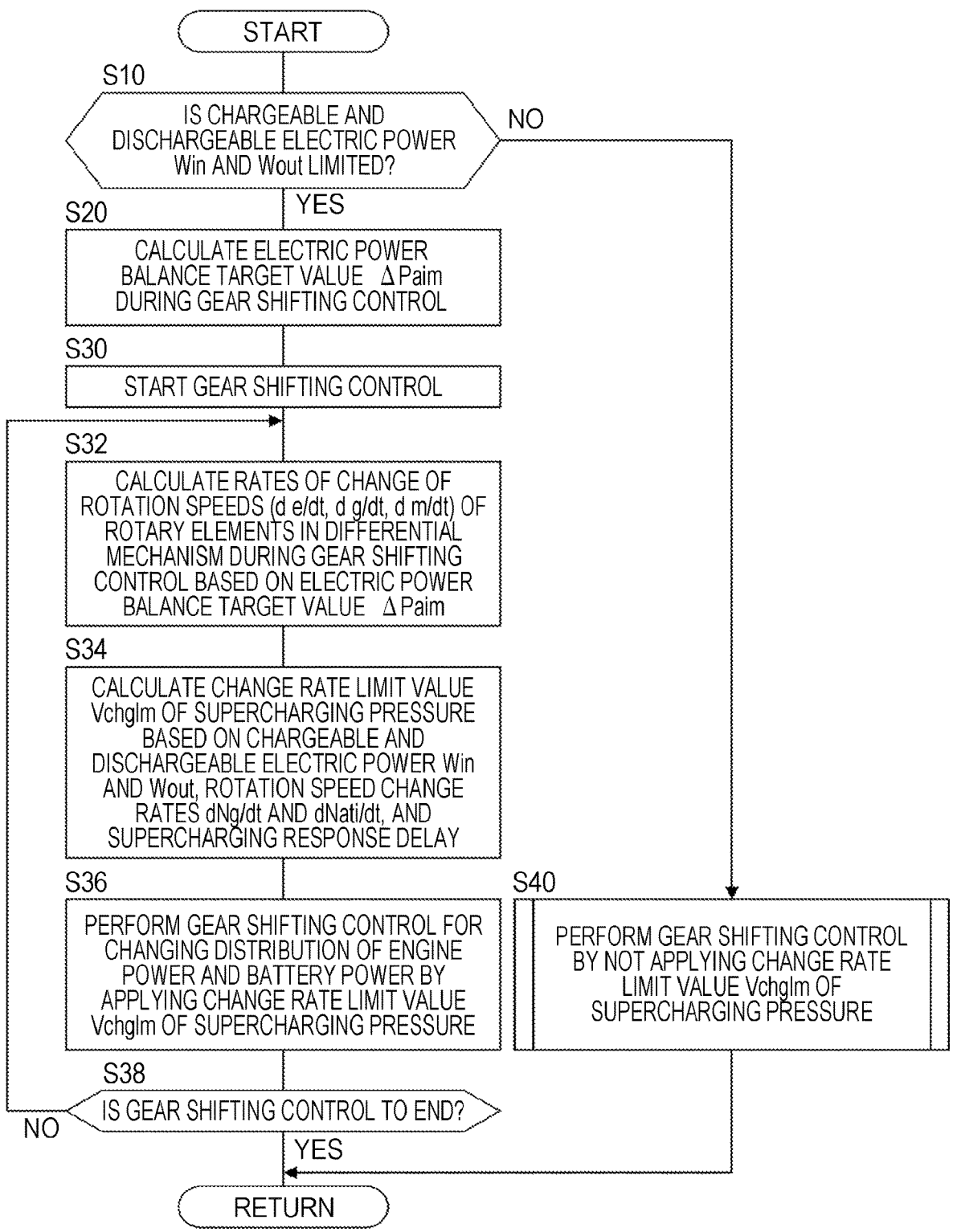
FIG. 11 is a diagram illustrating an example of a flowchart of a principal part of a control operation of an electronic control unit.

FIG. 11 is a diagram illustrating an example of a flowchart of a principal part of a control operation of an electronic control unit 100. The flowchart illustrated in FIG. 11 is performed when it is determined that gear shifting control in the stepped gear shifting unit 60 is to be performed.

First, in Step S10 corresponding to the function of the determination unit 102, it is determined whether the chargeable and dischargeable electric power Win and Wout is limited. When the determination result of Step S10 is positive, Step S20 is performed. When the determination result of Step S10 is negative, Step S40 is performed.

In Step S20 corresponding to the function of the drive power control unit 104, the electric power balance target value ΔPaim during gear shifting control is calculated. Then, Step S30 is performed.

In Step S30 corresponding to the function of the drive power control unit 104, gear shifting control is started. Then, Step S32 is performed.

In Step S32 corresponding to the function of the drive power control unit 104, target values of the rotation speed change rates dω/dt of the rotary elements RE1, RE2, and RE3 of the differential mechanism 80 during gear shifting control are calculated based on the electric power balance target value ΔPaim. Then, Step S34 is performed.

In Step S34 corresponding to the function of the limitation unit 106, the change rate limit value Vchglm is calculated based on the chargeable and dischargeable electric power Win and Wout, the rotation speed change rate dNg/dt, the rotation speed change rate dNati/dt, and the supercharging response delay during gear shifting control. Then, Step S36 is performed.

In Step S36 corresponding to the function of the drive power control unit 104, the engine 12, the first rotary machine MG1, the second rotary machine MG2, and the stepped gear shifting unit 60 are controlled such that gear shifting control in the stepped gear shifting unit 60 is performed. During the gear shifting control, the change rate limit value Vchglm calculated in Step S34 is applied. That is, the engine 12 is controlled in a state in which the rate of change Vchg of the supercharging pressure is limited such that the change rate limit value Vchglm is not exceeded. Then, Step S38 is performed.

In Step S38 corresponding to the function of the drive power control unit 104, it is determined whether gear shifting control has ended. When the determination result of Step S38 is positive, the process flow is performed again. When the determination result of Step S38 is negative, Step S32 is performed again.

By repeatedly performing Steps S32 to S38, the actual rotation speed change rates dω/dt of the rotary elements RE1, RE2, and RE3 of the differential mechanism 80 are controlled to the target values of the rotation speed change rates dω/dt of the rotary elements RE1, RE2, and RE3 of the differential mechanism 80 at which the charging/discharging electric power balance of the battery 54 reaches the electric power balance target value ΔPaim. Accordingly, gear shifting control is performed such that the charging/discharging electric power balance of the battery 54 reaches the electric power balance target value ΔPaim.

In Step S40 corresponding to the function of the drive power control unit 104, gear shifting control is performed. During the gear shifting control of Step S40, the change rate limit value Vchglm is not applied. That is, the engine 12 is controlled such that the rate of change Vchg of the supercharging pressure is not limited by the change rate limit value Vchglm. Then, the process flow is performed again.

Figure 12:
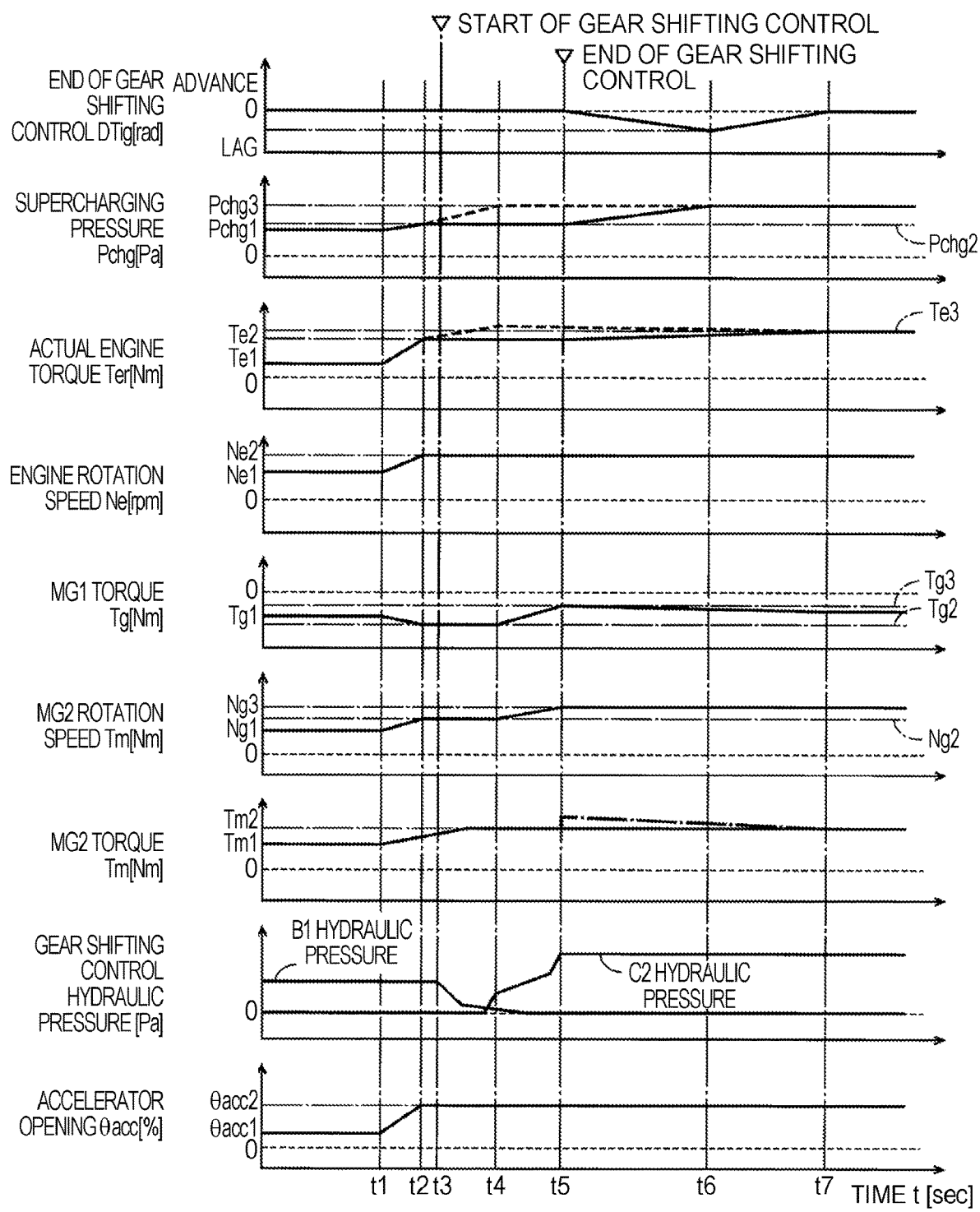
FIG. 12 is a diagram illustrating an example of a timing chart when the control operation of the electronic control unit illustrated in FIG. 11 is performed.

FIG. 12 illustrates an example of a timing chart when the control operation of the electronic control unit 100 illustrated in FIG. 11 is performed.

In FIG. 12, the horizontal axis represents time t [sec] and the vertical axis represents an ignition time delay DTig [rad], the supercharging pressure Pchg, the actual engine torque Ter, the engine rotation speed Ne, the MG1 torque Tg, the MG1 rotation speed Ng, the MG2 torque Tm, the MG2 rotation speed Nm, control hydraulic pressures Pc2 [Pa] and Pb1 [Pa] of the clutch C2 and the brake B1, and the accelerator opening θacc sequentially from the top. Graphs when the rate of change Vchg of the supercharging pressure is limited by the change rate limit value Vchglm are indicated by solid lines, and graphs when the rate of change Vchg of the supercharging pressure is not limited by the change rate limit value Vchglm are indicated by dotted lines for the purpose of comparison.

First, the graphs (solid lines) when the rate of change Vchg of the supercharging pressure is limited will be described below.

In a period before time t1, the accelerator opening θacc has an opening value θacc1 (>0), the ignition time delay Dig is 0, the supercharging pressure Pchg has a pressure value Pchg1 (>0), the actual engine torque Ter has a torque value Te1 (>0), the engine rotation speed Ne has a rotation speed value Ne1 (>0), the MG1 torque Tg has a torque value Tg1 (<0), the MG1 rotation speed Ng has a rotation speed value Ng1 (>0), the MG2 torque Tm has a torque value Tm1 (>0), and the vehicle 10 is traveling in a state in which the second AT gear stage ("2nd") is formed in the stepped gear shifting unit 60 based on the opening value θacc1 and the vehicle speed V.

In a period from time t1 to time t2 (>t1), the accelerator opening θacc increases from the opening value θacc1 to an opening value θacc2 (>θacc1), for example, by a driver's depression of an accelerator pedal. With this increase in the accelerator opening θacc, the actual engine torque Ter increases from the torque value Te1 to a torque value Te2 (>Te1), the engine rotation speed Ne increases from the rotation speed value Ne1 to a rotation speed value Ne2 (>Ne1), and the supercharging pressure Pchg also increases from the pressure value Pchg1 to a pressure value Pchg2 (>Pchg1). The MG1 torque Tg decreases from the torque value Tg1 to a torque value Tg2 (<Tg1) (a negative torque which is a reaction torque increases), the MG1 rotation speed Ng increases from the rotation speed value Ng1 to a rotation speed value Ng2 (>Ng1), and the generated electric power Wg in the first rotary machine MG1 increases. The second rotary machine MG2 is rotationally driven with the increased generated electric power Wg and the MG2 torque Tm increases from the torque value Tm1. With the increase in the actual engine torque Ter and the MG2 torque Tm, the vehicle speed V increases, and it is determined that gear shifting control for switching the gear stage which is formed in the stepped gear shifting unit 60 from the second AT gear stage to the third AT gear stage is performed.

Before gear shifting control for switching the gear stage from the second AT gear stage to the third AT gear stage is performed, the electric power balance target value ΔPaim during gear shifting control is calculated and the change rate limit value Vchglm is calculated based on the chargeable and dischargeable electric power Win and Wout, the rotation speed change rate dNg/dt, the rotation speed change rate dNati/dt, and the supercharging response delay during gear shifting control.

Gear shifting control is started at time t3 (>t2), and the gear shifting control is ended at time t5 (>t3). The period from time t3 to time t5 is a period in which the gear shifting control is performed.

In a period from time t3 to time t4 (t5>t4>t3), a gear shifting control hydraulic pressure Pb1 for controlling engagement and disengagement of the brake B1 changes gradually from a high state to a low state. On the other hand, in a period from time t4 to time t5, a gear shifting control hydraulic pressure Pc2 for controlling engagement and disengagement of the clutch C2 changes gradually from a low state to a high state. In this way, in the period of gear shifting control from time t3 to time t5, the gear shift from the second AT gear stage to the third AT gear stage is performed by so-called clutch-to-clutch gear shifting in which the disengagement operation of the brake B1 and the engagement operation of the clutch C2 are performed in an underlapped state by so-called clutch-to-clutch gear shifting.

In the period from time t4 to time t5, the MG1 torque Tg increases from the torque value Tg2 to a torque value Tg3 (0>Tg3>Tg2) (a negative torque which is a reaction torque decreases), and the MG1 rotation speed Ng increases from the rotation speed value Ng2 to a rotation speed value Ng3.

In the period of gear shifting control from time t3 to time t5, the rate of change Vchg of the supercharging pressure is limited by the change rate limit value Vchglm such that the charging/discharging electric power balance of the battery 54 reaches the electric power balance target value ΔPaim. In this timing chart, for the purpose of easy understanding of the disclosure, the change rate limit value Vchglm is 0 such that the supercharging pressure Pchg does not change and the actual engine torque Ter does not also change.

After time t5 which is an end time of the gear shifting control, the limitation by the change rate limit value Vchglm is gradually released. Accordingly, in a period from time t5 to time t6 (>t5), the supercharging pressure Pchg increases slowly from the pressure value Pchg2 to a pressure value Pchg3 (>Pchg2). That is, the limitation unit 106 (see FIG. 1) gradually releases the limitation by the change rate limit value Vchglm after the gear shifting control has ended. In a period from time t5 to time t7 (>t6), the actual engine torque Ter increases from the torque value Te2 to a torque value Te3 (>Te2) with the increase of the supercharging pressure Pchg. The torque value Te3 is a required engine torque Tedem which is required by a driver.

In a period from time t5 to time t7, the actual engine torque Ter increases slowly by performing ignition delay control for delaying the ignition time of the engine 12. With the increase of the actual engine torque Ter, the MG1 torque Tg decreases gradually from the torque value Tg3 (the negative torque which is a reaction torque increases). That is, the engine control unit 108 (see FIG. 1) performs torque adjustment by performing delay control after the gear shifting control has ended.

In the period from time t5 to time t7, an assist torque is output from the second rotary machine MG2 as indicated by an alternate long and short dash line to compensate for the unevenness of the torque output to the intermediate transmission member 76 based on the difference ΔTe between the required engine torque Tedem (a torque value Te3) and the actual engine torque Ter due to the limitation of the rate of change Vchg of the supercharging pressure.

Graphs (dotted lines) when the rate of change Vchg of the supercharging pressure is not limited by the change rate limit value Vchglm will be described below. In the graphs when the rate of change Vchg of the supercharging pressure is not limited by the change rate limit value Vchglm, description of the same part as when the rate of change Vchg of the supercharging pressure is limited by the change rate limit value Vchglm will be appropriately omitted.

Since the engine rotation speed Ne increases to the rotation speed value Ne2 at time t2, the supercharging pressure Pchg increases to the pressure value Pchg3 without being limited by the change rate limit value Vchglm after time t2. In this way, when the rate of change Vchg of the supercharging pressure is limited, the supercharging pressure Pchg increases to the pressure value Pchg3 at time t6, but when the rate of change Vchg of the supercharging pressure is not limited, the supercharging pressure Pchg increases to the pressure value Pchg3 earlier than time t6. Accordingly, the actual engine torque Ter increases to the required engine torque Tedem (the torque value Te3) early.

The vehicle 10 in which the electronic control unit 100 according to this embodiment is mounted includes the engine 12 with the supercharger 18, the first rotary machine MG1, the differential mechanism 80 that includes the first rotary element RE1 which is connected to the engine 12 in a power-transmittable manner, the second rotary element RE2 which is connected to the first rotary machine MG1 in a power-transmittable manner, and the third rotary element RE3 which is connected to the intermediate transmission member 76 capable of transmitting power to the driving wheels 16, the second rotary machine MG2 that is connected to the intermediate transmission member 76 in a power-transmittable manner, and the battery 54 that transmits and receives electric power to and from the first rotary machine MG1 and the second rotary machine MG2, and the stepped gear shifting unit 60 is provided between the differential mechanism 80 and the driving wheels 16.

The control device for a hybrid vehicle according to this embodiment includes (a) the drive power control unit 104 that performs gear shifting control such that the charging/discharging electric power balance of the battery 54 reaches the electric power balance target value ΔPaim and (b) the limitation unit 106 that limits the rate of change Vchg of the supercharging pressure from the supercharger 18 when the chargeable and dischargeable electric power Win and Wout of the battery 54 is limited during gear shifting control and increases the limitation of the rate of change Vchg of the supercharging pressure when the limitation of the chargeable and dischargeable electric power Win and Wout is great more than when the limitation of the chargeable and dischargeable electric power Win and Wout is small. When a response delay of the supercharging pressure Pchg occurs during the gear shifting control of the stepped gear shifting unit 60, unevenness in the actual engine torque Ter is likely to increase and the charging/discharging electric power balance of the battery 54 is less likely to be achieved. Particularly, when the chargeable and dischargeable electric power Win and Wout of the battery 54 is limited, the charging/discharging electric power balance is less likely to be achieved. The limitation of the rate of change Vchg of the supercharging pressure becomes greater and the unevenness in the actual engine torque Ter becomes less when the limitation of the chargeable and dischargeable electric power Win and Wout is great than when the limitation of the chargeable and dischargeable electric power Win and Wout is small, during the gear shifting control of the stepped gear shifting unit 60. Accordingly, it is possible to easily achieve the charging/discharging electric power balance during gear shifting control in the stepped gear shifting unit 60 and to curb deterioration in the charging/discharging electric power balance.

According to this embodiment, the limitation unit 106 increases the limitation of the rate of change Vchg of the supercharging pressure when the rotation speed change rate dNati/dt of the AT input shaft 76 in the stepped gear shifting unit 60 is great more than when the rotation speed change rate dNati/dt is small. When a gear shifting time is shortened for rapid gear shifting, the rotation speed change rate dNati/dt of the AT input shaft 76 in the stepped gear shifting unit 60, that is, the rotation speed change rate dωm/dt of the differential mechanism 80 having the same value, increases. The unevenness in the actual engine torque Ter due to a response delay of the supercharging pressure Pchg is more likely to increase and the charging/discharging electric power balance of the battery 54 is less likely to be achieved when the rotation speed change rate dNati/dt of the AT input shaft 76 in the stepped gear shifting unit 60 during gear shifting control is great (when the rotation speed change rate dωm/dt of the differential mechanism 80 is great) than when the rotation speed change rate dNati/dt is small. The limitation of the rate of change Vchg of the supercharging pressure becomes greater and thus the unevenness in the actual engine torque Ter becomes less when the rotation speed change rate dNati/dt of the AT input shaft 76 in the stepped gear shifting unit 60 is great than when the rotation speed change rate dNati/dt is small. Accordingly, it is possible to easily achieve the charging/discharging electric power balance during gear shifting control of the stepped gear shifting unit 60 and to curb deterioration in the charging/discharging electric power balance.

Figure 13:
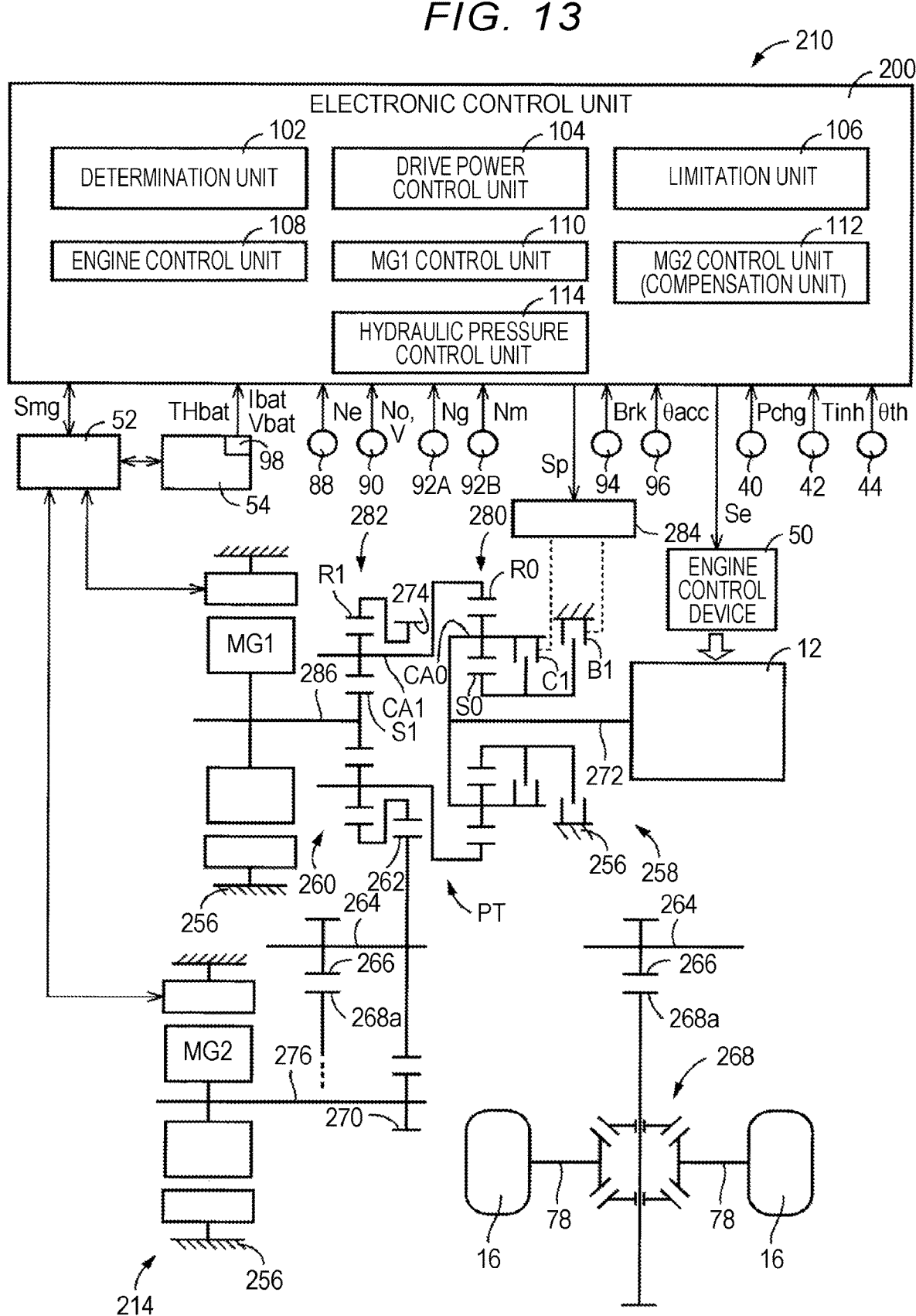
FIG. 13 is a functional block diagram schematically illustrating a configuration of a vehicle in which an electronic control unit according to a second embodiment of the disclosure is mounted and illustrating a principal part of a control function for various types of control in the vehicle.

FIG. 13 is a functional block diagram schematically illustrating a configuration of a hybrid vehicle 210 in which an electronic control unit 200 according to a second embodiment of the disclosure is mounted and illustrating a principal part of a control function for various types of control in the hybrid vehicle 210. The hybrid vehicle 210 (hereinafter referred to as a "vehicle 210") includes an engine 12, a first rotary machine MG1, a second rotary machine MG2, a power transmission device 214, and driving wheels 16. Elements of the second embodiment which are substantially common to the functions of the first embodiment will be referred to by the same reference signs and description thereof will not be repeated.

An engine torque Te of the engine 12 is controlled by causing an electronic control unit 200 which will be described later to control an engine control device 50 which is provided in the vehicle 210.

The first rotary machine MG1 and the second rotary machine MG2 are connected to a battery 54 which is provided in the vehicle 210 via an inverter 52 which is provided in the vehicle 210. In the first rotary machine MG1 and the second rotary machine MG2, an MG1 torque Tg and an MG2 torque Tm are controlled by causing the electronic control unit 200 which will be described later to control the inverter 52.

The power transmission device 214 includes a stepped gear shifting unit 258, a stepless gear shifting unit 260, a driven gear 262, a driven shaft 264, a final gear 266, a differential gear 268, and a reduction gear 270 in a case 256. The stepped gear shifting unit 258 and the stepless gear shifting unit 260 are arranged coaxially with an input shaft 272 which is an input rotary member of the stepped gear shifting unit 258. The stepped gear shifting unit 258 is connected to the engine 12 via the input shaft 272 or the like. The stepless gear shifting unit 260 is connected in series to the stepped gear shifting unit 258. The driven gear 262 engages with a drive gear 274 which is an output rotary member of the stepless gear shifting unit 260. The driven shaft 264 fixes the driven gear 262 and the final gear 266 such that they cannot rotate relative to each other. The final gear 266 has a smaller diameter than the driven gear 262. The differential gear 268 engages with the final gear 266 via a differential ring gear 268a. The reduction gear 270 has a smaller diameter than the driven gear 262 and engages with the driven gear 262. A rotor shaft 276 of the second rotary machine MG2 which is disposed in parallel to the input shaft 272 is connected to the reduction gear 270 separately from the input shaft 272, and the second rotary machine MG2 is connected to the driven gear 262 in a power-transmittable manner. The power transmission device 214 includes axles 78 that are connected to the differential gear 268.

The power transmission device 214 having this configuration is suitably used for a vehicle of a front-engine front-drive (FF) type or a rear-engine rear-drive (RR) type. In the power transmission device 214, power which is output from the engine 12, the first rotary machine MG1, and the second rotary machine MG2 is transmitted to the driven gear 262. The power transmitted to the driven gear 262 is transmitted to the driving wheels 16 sequentially via the final gear 266, the differential gear 268, the axles 78, and the like. The stepped gear shifting unit 258, the stepless gear shifting unit 260, the driven gear 262, the driven shaft 264, the final gear 266, the differential gear 268, and the axles 78 in the power transmission device 214 constitute a power transmission path PT which is provided between the engine 12 and the driving wheels 16. In this way, the second rotary machine MG2 is connected to the power transmission path PT via the reduction gear 270 in a power-transmittable manner, and the second rotary machine MG2 is connected to the driving wheels 16 in a power-transmittable manner.

The gear shifting unit 258 includes a first planetary gear mechanism 280, a clutch C1, and a brake B1. The first planetary gear mechanism 280 is a known single-pinion type planetary gear device including a sun gear S0, a carrier CA0, and a ring gear R0. The stepless gear shifting unit 260 includes a second planetary gear mechanism 282. The second planetary gear mechanism 282 is a known single-pinion type planetary gear device including a sun gear S1, a carrier CA1, and a ring gear R1.

In the clutch C1 and the brake B1, operating states such as an engaged state and a disengaged state are switched based on regulated hydraulic pressures which are output from a hydraulic pressure control circuit 284 by causing the electronic control unit 200 which will be described later to control the hydraulic pressure control circuit 284 provided in the vehicle 210.

The first planetary gear mechanism 280, the second planetary gear mechanism 282, the clutch C1, and the brake B1 are connected as illustrated in FIG. 13.

In a state in which both the clutch C1 and the brake B1 are disengaged, a differential motion of the first planetary gear mechanism 280 is permitted. In this state, since a reaction torque of the engine torque Te does not appear in the sun gear S0, the stepped gear shifting unit 258 is in a neutral state in which mechanical power transmission is not possible, that is, a neutral state. In a state in which the clutch C1 is engaged and the brake B1 is disengaged, the rotary elements of the first planetary gear mechanism 280 rotate integrally. In this state, rotation of the engine 12 is transmitted from the ring gear R0 to the carrier CA1 at a constant speed. On the other hand, in a state in which the clutch C1 is disengaged and the brake B1 is engaged, rotation of the sun gear S0 of the first planetary gear mechanism 280 is prohibited and rotation of the ring gear R0 is increased to be higher than rotation of the carrier CA0. In this state, the rotation of the engine 12 is increased and is output from the ring gear R0.

In this way, the stepped gear shifting unit 258 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 280 is prohibited. In this state, rotation of the ring gear R0 which is an output rotary member of the stepped gear shifting unit 258 is stopped and thus rotation of the carrier CA1 which is an input rotary member of the stepless gear shifting unit 260 is stopped.

In the second planetary gear mechanism 282, the engine 12 is connected to the carrier CA1 corresponding to the first rotary element RE1 in a power-transmittable manner, the first rotary machine MG1 is connected to the sun gear S1 corresponding to the second rotary element RE2 in a power-transmittable manner, and the drive gear 274 capable of transmitting power to the driving wheels 16 is connected to the ring gear R1 corresponding to the third rotary element RE3 in a power-transmittable manner. The sun gear S1 is a rotary element that is integrally connected to the rotor shaft 286 of the first rotary machine MG1 and is connected to the first rotary machine MG1 in a power-transmittable manner. The ring gear R1 is a rotary element that is integrally connected to the drive gear 274 and is connected to the driving wheels 16 in a power-transmittable manner, and serves as an output rotary member of the stepless gear shifting unit 260. The drive gear 274 corresponds to a "transmission member" in the claims, and the second planetary gear mechanism 282 corresponds to a "differential mechanism" in the claims.

The second planetary gear mechanism 282 is a power split mechanism that mechanically splits power of the engine 12 which is input to the carrier CA1 via the stepped gear shifting unit 258 to the first rotary machine MG1 and the drive gear 274. That is, the second planetary gear mechanism 282 is a differential mechanism that splits and transmits the power of the engine 12 to the driving wheels 16 and the first rotary machine MG1. In the second planetary gear mechanism 282, the carrier CA1 serves as an input element, the sun gear S1 serves as a reaction element, and the ring gear R1 serves as an output element. The stepless gear shifting unit 260 constitutes an electric gear shifting mechanism, for example, an electric stepless transmission, in which a differential state of the second planetary gear mechanism 282 (that is, a differential state of that stepless gear shifting unit 260) is controlled by controlling the operating state of the first rotary machine MG1 that is connected to the second planetary gear mechanism 282 in a power-transmittable manner. The stepless gear shifting unit 260 which is a stepless transmission is provided in the power transmission path PT. The first rotary machine MG1 is a rotary machine to which the power of the engine 12 is transmitted. Since the stepped gear shifting unit 258 is in an overdrive state, an increase in torque of the first rotary machine MG1 is curbed.

FIG. 14 is an engagement operation table illustrating a relationship between travel modes and combinations of operating states of the clutch C1 and the brake B1 which are used therein. In FIG. 14, "O" denotes an engaged state, a blank denotes a disengaged state, and "Δ" denotes that one of the clutch C1 and the brake B1 is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including a single-motor EV travel mode and a double-motor EV travel mode.

The single-motor EV travel mode is a travel mode in which the engine 12 is not used as a drive power source for travel and only the second rotary machine MG2 is used as a drive power source for travel. The single-motor EV travel mode is realized in a state in which both the clutch C1 and the brake B1 are disengaged. In the single-motor EV travel mode, the clutch C1 and the brake B1 are disengaged and thus the stepped gear shifting unit 258 falls into a neutral state. When the stepped gear shifting unit 258 is in the neutral state, the stepless gear shifting unit 260 falls into a neutral state in which a reaction torque of the MG1 torque Tg does not appear in the carrier CA1 connected to the ring gear R0. In this state, the electronic control unit 200 causes the second rotary machine MG2 to output the MG2 torque Tm for travel. In the single-motor EV travel mode, reverse travel may be performed by rotating the second rotary machine MG2 oppositely to the rotating direction at the time of forward travel.

In the single-motor EV travel mode, since the ring gear R0 is corotated with the carrier CA1 but the stepped gear shifting unit 258 is in the neutral state, the engine 12 is not corotated but is stopped with zero rotation. Accordingly, when regeneration control is performed in the second rotary machine MG2 during travel in the single-motor EV travel mode, it is possible to take a large amount of regenerated electric power. When the battery 54 is fully charged and regenerative energy is not taken during travel in the single-motor EV travel mode, additional use of the engine brake can be considered. When the engine brake is used together, the brake B1 or the clutch C1 is engaged. When the brake B1 or the clutch C1 is engaged, the engine 12 is corotated and the engine brake operates.

The double-motor EV travel mode is a travel mode in which both the first rotary machine MG1 and the second rotary machine MG2 are used as drive power sources for travel. The double-motor EV travel mode is realized in a state in which both the clutch C1 and the brake B1 are engaged. In the double-motor EV travel mode, since the clutch C1 and the brake B1 are engaged, rotation of the rotary elements of the first planetary gear mechanism 280 is stopped, the engine 12 is stopped with zero rotation, and rotation of the carrier CA1 connected to the ring gear R0 is stopped. When the rotation of the carrier CA1 is stopped, a reaction torque of the MG1 torque Tg appears in the carrier CA1, and thus the MG1 torque Tg can be mechanically output from the ring gear R1 and be transmitted to the driving wheels 16. In this state, the electronic control unit 200 causes the first rotary machine MG1 and the second rotary machine MG2 to output the MG1 torque Tg and the MG2 torque Tm for travel. In the double-motor EV travel mode, both the first rotary machine MG1 and the second rotary machine MG2 can be rotated oppositely to the rotating direction at the time of forward travel to allow reverse travel.

The HV travel mode is a travel mode in which at least the engine 12 is used as a drive power source for travel. A low state of the HV travel mode is realized in a state in which the clutch C1 is engaged and the brake B1 is disengaged. In the low state of the HV travel mode, since the clutch C1 is engaged, the rotary elements of the first planetary gear mechanism 280 are integrally rotated and the stepped gear shifting unit 258 falls into a directly coupled state. Accordingly, rotation of the engine 12 is transmitted from the ring gear R0 to the carrier CA1 at a constant speed. A high state of the HV travel mode is realized in a state in which the brake B1 is engaged and the clutch C1 is disengaged. In the high state of the HV travel mode, since the brake B1 is engaged, rotation of the sun gear S0 is stopped and the stepped gear shifting unit 258 falls into an overdrive state. Accordingly, rotation of the engine 12 increases and is transmitted from the ring gear R0 to the carrier CAL In the HV travel mode, the electronic control unit 200 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1. In the HV travel mode, for example, in the low state of the HV travel mode, the second rotary machine MG2 can also be rotated oppositely to the rotating direction at the time of forward travel to allow reverse travel. In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Referring back to FIG. 13, the vehicle 210 further includes the electronic control unit 200 which is a controller including a control device for the vehicle 210 associated with control of the engine 12, the first rotary machine MG1, the second rotary machine MG2, and the like. The electronic control unit 200 has substantially the same configuration as the electronic control unit 100 described above in the first embodiment. The electronic control unit 200 is supplied with various signals which are the same as those supplied to the electronic control unit 100 (the rotation speed of the drive gear 274 constrained on the rotation of the driving wheels 16 is detected and input as an output rotation speed No [rpm] by the output rotation speed sensor 90 in this embodiment). Various command signals which are the same as those output from the electronic control unit 100 are output from the electronic control unit 200. The electronic control unit 200 has the same functions as the functions of the determination unit 102, the drive power control unit 104, the limitation unit 106, the engine control unit 108, the MG1 control unit 110, the MG2 control unit 112, and the hydraulic pressure control unit 114 similarly to the electronic control unit 100. The electronic control unit 200 corresponds to a "control device" in the claims.

The control operation of the electronic control unit 200 is substantially the same as the electronic control unit 100 in the first embodiment, except that the control operation is performed "during gear shifting control in the stepped gear shifting unit 60" in the first embodiment but the control operation is performed "during acceleration control in the vehicle 210" in this embodiment. That is, the control operation of the electronic control unit 100 "during gear shifting control in the stepped gear shifting unit 60" in the first embodiment is replaced with the control operation of the electronic control unit 200 "during acceleration control in the vehicle 210" in this embodiment. In this embodiment, a mechanical gear shifting mechanism is not provided between the second planetary gear mechanism 282 which is a differential mechanism and the driving wheels 16 unlike the first embodiment. Accordingly, the change rate limit value Vchglm is calculated based on the chargeable and dischargeable electric power Win and Wout, the rotation speed change rate dNg/dt, and the supercharging response delay during acceleration control. Accordingly, differences of this embodiment from the first embodiment will be mainly described below and description of elements common to the first embodiment will be appropriately omitted.

Figure 15:
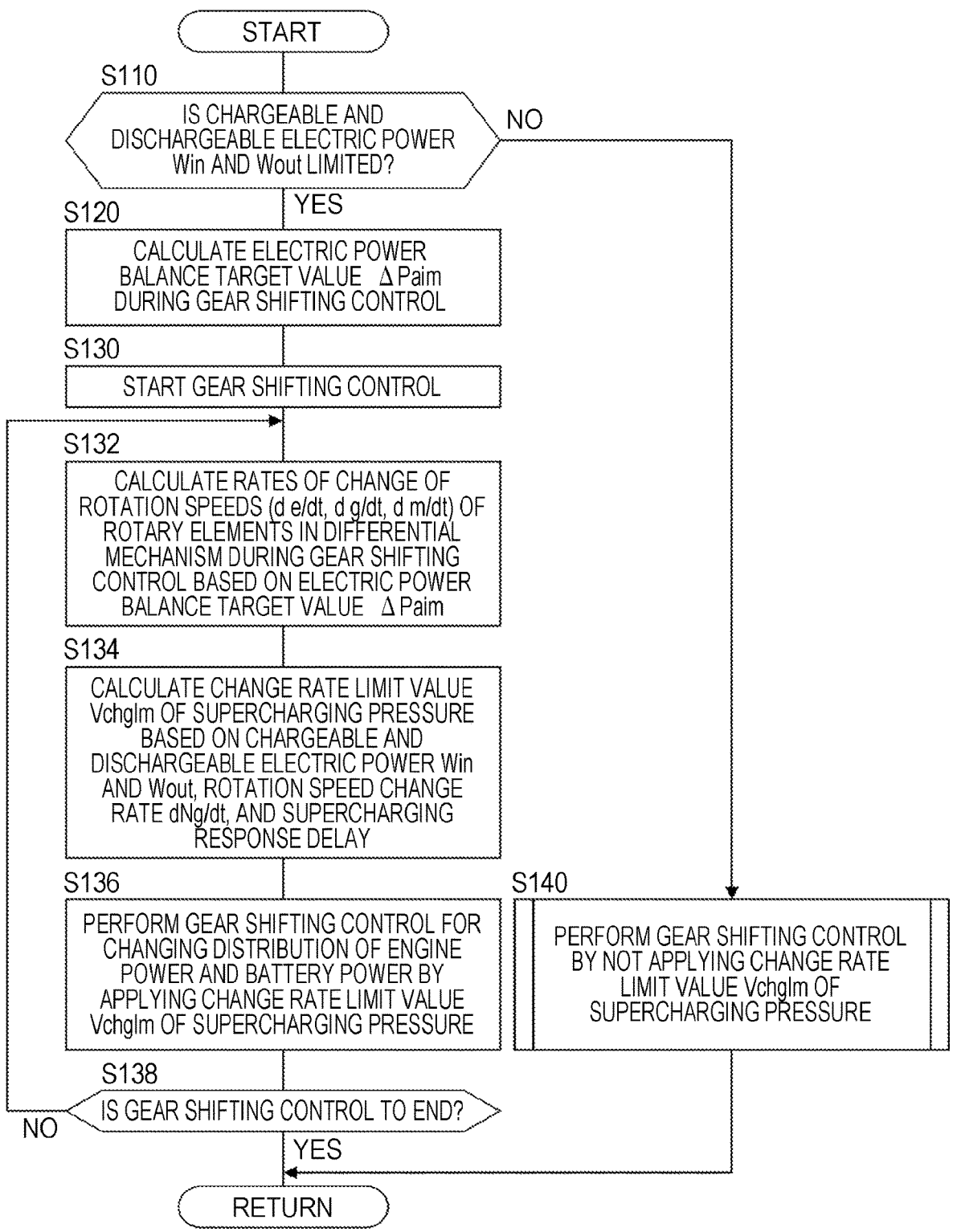
FIG. 15 is a diagram illustrating an example of a flowchart of a principal part of a control operation of an electronic control unit.

FIG. 15 illustrates an example of a flowchart of a principal part of the control operation of the electronic control unit 200. The flowchart illustrated in FIG. 15 is performed when it is determined that acceleration control is to be performed in the vehicle 210.

First, in Step S110 corresponding to the function of the determination unit 102, it is determined whether the chargeable and dischargeable electric power Win and Wout is limited. When the determination result of Step S110 is positive, Step S120 is performed. When the determination result of Step S110 is negative, Step S140 is performed.

In Step S120 corresponding to the function of the drive power control unit 104, the electric power balance target value $\Delta$Paim during acceleration control is calculated. Then, Step S130 is performed.

In Step S130 corresponding to the function of the drive power control unit 104, acceleration control is started. Then, Step S132 is performed.

In Step S132 corresponding to the function of the drive power control unit 104, target values of the rotation speed change rates $d\omega/dt$ of the rotary elements of the second planetary gear mechanism 282 (an e axis indicating the rotation sped of the carrier CA1 corresponding to the first rotary element RE1, a g axis indicating the rotation speed of the sun gear S1 corresponding to the second rotary element RE2, and an m axis indicating the rotation speed of the ring gear R1 corresponding to the third rotary element RE3) during acceleration control are calculated based on the electric power balance target value ΔPaim. Then, Step S134 is performed.

In Step S134 corresponding to the function of the limitation unit 106, the change rate limit value Vchglm is calculated based on the chargeable and dischargeable electric power Win and Wout, the rotation speed change rate dNg/dt, and the supercharging response delay during acceleration control. Then, Step S136 is performed.

In Step S136 corresponding to the function of the drive power control unit 104, the engine 12, the first rotary machine MG1, and the second rotary machine MG2 are controlled such that acceleration control in the vehicle 210 is performed. During the acceleration control, the change rate limit value Vchglm calculated in Step S134 is applied. That is, the engine 12 is controlled in a state in which the rate of change Vchg of the supercharging pressure is limited such that the change rate limit value Vchglm is not exceeded. Then, Step S138 is performed.

In Step S138 corresponding to the function of the drive power control unit 104, it is determined whether acceleration control has ended. When the determination result of Step S138 is positive, the process flow is performed again. When the determination result of Step S138 is negative, Step S132 is performed again.

By repeatedly performing Steps S132 to S138, the actual rotation speed change rates dω/dt of the rotary elements RE1, RE2, and RE3 of the second planetary gear mechanism 282 are controlled to the target values of the rotation speed change rates do/dt of the rotary elements RE1, RE2, and RE3 of the second planetary gear mechanism 282 (a differential mechanism) at which the charging/discharging electric power balance of the battery 54 reaches the electric power balance target value ΔPaim. Accordingly, acceleration control is performed such that the charging/discharging electric power balance of the battery 54 reaches the electric power balance target value ΔPaim.

In Step S140 corresponding to the function of the drive power control unit 104, acceleration control is performed. During the acceleration control of Step S140, the change rate limit value Vchglm is not applied. That is, the engine 12 is controlled such that the rate of change Vchg of the supercharging pressure is not limited by the change rate limit value Vchglm. Then, the process flow is performed again.

The vehicle 210 in which the electronic control unit 200 according to this embodiment is mounted includes the engine 12 with the supercharger 18, the first rotary machine MG1, the second planetary gear mechanism (differential mechanism) 282 that includes the first rotary element RE1 which is connected to the engine 12 in a power-transmittable manner, the second rotary element RE2 which is connected to the first rotary machine MG1 in a power-transmittable manner, and the third rotary element RE3 which is connected to the drive gear 274 capable of transmitting power to the driving wheels 16, the second rotary machine MG2 that is connected to the drive gear 274 in a power-transmittable manner, and the battery 54 that transmits and receives electric power to and from the first rotary machine MG1 and the second rotary machine MG2.

The control device for a hybrid vehicle according to this embodiment includes (a) the drive power control unit 104 that performs acceleration control such that the charging/discharging electric power balance of the battery 54 reaches the electric power balance target value ΔPaim and (b) the limitation unit 106 that limits the rate of change Vchg of the supercharging pressure from the supercharger 18 when the chargeable and dischargeable electric power Win and Wout of the battery 54 is limited during acceleration control and increases the limitation of the rate of change Vchg of the supercharging pressure when the limitation of the chargeable and dischargeable electric power Win and Wout is great more than when the limitation of the chargeable and dischargeable electric power Win and Wout is small. When a response delay of the supercharging pressure Pchg occurs during the acceleration control, unevenness in the actual engine torque Ter is likely to increase and the charging/discharging electric power balance of the battery 54 is less likely to be achieved. Particularly, when the chargeable and dischargeable electric power Win and Wout of the battery 54 is limited, the charging/discharging electric power balance is less likely to be achieved. The limitation of the rate of change Vchg of the supercharging pressure becomes greater and the unevenness in the actual engine torque Ter becomes less when the limitation of the chargeable and dischargeable electric power Win and Wout is great than when the limitation of the chargeable and dischargeable electric power Win and Wout is small. Accordingly, it is possible to easily achieve the charging/discharging electric power balance during acceleration control and to curb deterioration in the charging/discharging electric power balance.

According to this embodiment, the limitation unit 106 increases the limitation of the rate of change Vchg of the supercharging pressure when the rotation speed change rate dNg/dt of the MG1 rotation speed Ng which is the rotation speed of the first rotary machine MG1 is great more than when the rotation speed change rate dNg/dt is small. When an acceleration time is shortened for the purpose of rapid acceleration, the rotation speed change rate dNg/dt of the first rotary machine MG1, that is, the rotation speed change rate dωg/dt of the second planetary gear mechanism 282 having the same value, increases. The unevenness in the actual engine torque Ter due to a response delay of the supercharging pressure Pchg is more likely to increase and the charging/discharging electric power balance of the battery 54 is less likely to be achieved when the rotation speed change rate dNg/dt of the first rotary machine MG1 during acceleration control is great (when the rotation speed change rate dωg/dt of the second planetary gear mechanism 282 is great) than when the rotation speed change rate dNg/dt is small. The limitation of the rate of change Vchg of the supercharging pressure becomes greater and the unevenness in the actual engine torque Ter becomes less when the rotation speed change rate dNg/dt of the first rotary machine MG1 is great than when the rotation speed change rate dNg/dt is small. Accordingly, it is possible to easily achieve the charging/discharging electric power balance during acceleration control and to curb deterioration in the charging/discharging electric power balance.

According to this embodiment, the limitation unit 106 increases the limitation of the rate of change Vchg of the supercharging pressure when the response delay of the supercharging pressure Pchg is great more than when the response delay of the supercharging pressure Pchg is small. The unevenness in the actual engine torque Ter is more likely to increase and the charging/discharging electric power balance of the battery 54 is less likely to be achieved when the response delay of the supercharging pressure Pchg is great than when the response delay of the supercharging pressure Pchg is small. The limitation of the rate of change Vchg of the supercharging pressure becomes greater and the unevenness in the actual engine torque Ter becomes less when the response delay of the supercharging pressure Pchg is great than when the response delay of the supercharging pressure Pchg is small. Accordingly, it is possible to easily achieve the charging/discharging electric power balance during acceleration control and to curb deterioration in the charging/discharging electric power balance.

The control device for a hybrid vehicle according to this embodiment further includes the compensation unit (the MG2 control unit 112) that compensates for unevenness in a torque which is output from the second planetary gear mechanism 282 which is the differential mechanism to the drive gear 274 which is the transmission member based on a difference ΔTe (=Tedem−Te) between the required engine torque Tedem and the actual engine torque Ter due to the limitation of the rate of change Vchg of the supercharging pressure using the MG2 torque Tm. The difference ΔTe occurs between the required engine torque Tedem and the actual engine torque Ter and the torque output from the second planetary gear mechanism 282 which is the differential mechanism to the drive gear 274 which is the transmission member becomes uneven due to the limitation of the rate of change Vchg of the supercharging pressure. However, this unevenness can be compensated for using the MG2 torque Tm, whereby it is possible to cope with an acceleration request from a driver.

While embodiments of the disclosure have been described above in detail with reference to the accompanying drawings, the disclosure can be applied to other aspects.

In the first embodiment, control for limiting the rate of change Vchg of the supercharging pressure is performed during gear shifting control of an upshift of switching the gear stage from the second AT gear stage to the third AT gear stage, but the disclosure is not limited thereto and such control may be performed, for example, during gear shifting control of a downshift.

In the second embodiment, control for limiting the rate of change Vchg of the supercharging pressure is performed during acceleration control, but the disclosure is not limited thereto and such control may be performed, for example, during deceleration control in the vehicle 210. Deceleration control is performed such that the charging/discharging electric power balance of the battery 54 reaches the electric power balance target value ΔPaim by controlling the actual rotation speed change rates dω/dt of the rotary elements RE1, RE2, and RE3 of the second planetary gear mechanism 282 to the target values of the rotation speed change rates dω/dt of the rotary elements RE1, RE2, and RE3 of the second planetary gear mechanism 282 (the differential mechanism) at which the charging/discharging electric power balance of the battery 54 reaches the electric power balance target value ΔPaim. Control for limiting the rate of change Vchg of the supercharging pressure during gear shifting control is performed in the first embodiment, but the disclosure is not limited thereto and, for example, similarly to the second embodiment, such control may be performed during acceleration control or may be performed during deceleration control. Acceleration control, deceleration control, and gear shifting control are types of "drive power control" which is performed by the drive power control unit 104 in the disclosure, and "drive power control" is control in which the supercharging pressure Pchg is changed and the engine torque Te is changed. For example, "drive power control" is control in which supercharging pressure Pchg is changed based on a change in the accelerator opening θacc and the engine torque Te is changed. By increasing the limitation of the rate of change Vchg of the supercharging pressure when the limitation of the chargeable and dischargeable electric power Win and Wout during drive power control is great more than when the limitation of the chargeable and dischargeable electric power Win and Wout is small, the unevenness in the actual engine torque Ter during drive power control is likely to decrease and the charging/discharging electric power balance is likely to be achieved, whereby it is possible to curb deterioration of the charging/discharging electric power balance.

The change rate limit value Vchglm is calculated using four parameters of the chargeable and dischargeable electric power Win and Wout, the rotation speed change rate dNg/dt, the rotation speed change rate dNati/dt, and the supercharging response delay during gear shifting control as variables in the first embodiment and the change rate limit value Vchglm is calculated using three parameters of the chargeable and dischargeable electric power Win and Wout, the rotation speed change rate dNg/dt, and the supercharging response delay during acceleration control as variables in the second embodiment, but the disclosure is not limited to these aspects. For example, the change rate limit value Vchglm can be calculated using at least the chargeable and dischargeable electric power Win and Wout of four parameters or three parameters as a variable.

In the first and second embodiments, the basic value of the electric power balance target value ΔPaim is [(Wout+Win)/2], but the disclosure is not limited thereto. For example, the basic value of the electric power balance target value ΔPaim may be 0. Accordingly, since inputting and outputting of electric power to and from the battery 54 are curbed before and after gear shifting control or before and after acceleration control, it is possible to extend a battery lifespan of the battery 54.

In the first and second embodiments, the charging/discharging electric power is limited when the chargeable electric power Win is less than the predetermined first electric power value or when the dischargeable electric power Wout is less than the predetermined second electric power value, but this determination may be performed in at least one of the case in which the chargeable electric power Win is less than the predetermined first electric power value and the case in which the dischargeable electric power Wout is less than the predetermined second electric power value. Determination of whether the charging/discharging electric power is limited may be performed based on the battery temperature Thb or the state of charge value SOC or based on the progress state of deterioration of the battery 54, for example, using the relationship illustrated in FIG. 7. For example, a degree of deterioration of the battery 54 is estimated based on a relationship between the degree of deterioration (the progress state of deterioration) of the battery 54 which is experimentally determined in advance and cumulative data of the current value of the charging/discharging current Ibat and the number of times of charging/discharging, and the charging/discharging electric power is limited to curb progress of deterioration of the battery 54 when the estimated degree of deterioration is equal to or greater than a predetermined degree of deterioration. In this case, it is determined that the charging/discharging electric power is limited. The predetermined degree of deterioration is a predetermined threshold value for determining that it is necessary to curb progress of deterioration of the battery 54.

In the first and second embodiments, delay control is performed to perform torque adjustment after gear shifting control or acceleration control ends, but the disclosure is not limited thereto. For example, advance control is performed to perform torque adjustment after gear shifting control or acceleration control ends.

In the first and second embodiments, control for limiting the rate of change Vchg of the supercharging pressure in forward travel is performed, but the disclosure can also be applied for reverse travel.

In the first embodiment, the one-way clutch F0 is exemplified as a lock mechanism that can fix the carrier CA1 in a non-rotatable manner, but the disclosure is not limited to this aspect. This lock mechanism may be an engagement device such as a dog clutch, a hydraulic frictional engagement device such as a clutch or a brake, a dry engagement device, an electromagnetic frictional engagement device, or a magnetic powder type clutch which selectively connects the input shaft 72 and the case 56. Alternatively, the vehicle 10 does not have to include the one-way clutch F0.

In the second embodiment, the vehicle 210 may be a vehicle which does not include the stepped gear shifting unit 258 and in which the engine 12 is connected to the stepless gear shifting unit 260. The stepless gear shifting unit 260 may be a mechanism in which a differential operation can be limited by control of a clutch or brake connected to the rotary elements of the second planetary gear mechanism 282. The second planetary gear mechanism 282 may be a double pinion type planetary gear unit. The second planetary gear mechanism 282 may be a differential mechanism including four or more rotary elements by connection between a plurality of planetary gear units. The second planetary gear mechanism 282 may be a differential gear mechanism in which the first rotary machine MG1 and the drive gear 274 are connected to a pinion which is rotationally driven by the engine 12 and a pair of bevel gears engaging with the pinion, respectively. The second planetary gear mechanism 282 may be a mechanism with a configuration in which some rotary elements of two or more planetary gear units are connected to each other and the engine 12, the first rotary machine MG1, and the driving wheels 16 are connected to the rotary elements of such planetary gear units in a power-transmittable manner.

In the first and second embodiments, the supercharger 18 is a known exhaust turbine type supercharger, but the disclosure is not limited to this aspect. For example, the supercharger 18 may be a mechanical pump type supercharger that is rotationally driven by the engine or the electric motor. An exhaust turbine type supercharger and a mechanical pump type supercharger may be provided together as a supercharger.

The above-mentioned embodiments are merely exemplary and the disclosure can be embodied in various aspects which have been subjected to various modifications and improvements based on knowledge of those skilled in the art.

What is claimed is:

1. A control device for a hybrid vehicle including an engine with a supercharger, a first rotary machine, a differential mechanism that includes a first rotary element which is connected to the engine in a power-transmittable manner, a second rotary element which is connected to the first rotary machine in a power-transmittable manner, and a third rotary element which is connected to a transmission member capable of transmitting power to driving wheels, a second rotary machine that is connected to the transmission member in a power-transmittable manner, and a power storage device that transmits and receives electric power to and from the first rotary machine and the second rotary machine, the control device comprising:
   circuitry configured to perform gear shifting control for a mechanical gear shifting mechanism provided between the differential mechanism and the driving wheels by determining whether a charging/discharging electric power of the power storage device is limited;
   when it is determined that the charging/discharging electric power of the power storage device is limited
      calculating an electric power target value;
      starting the gear shifting control;
      calculating target values of rates of change of rotation speeds of the first rotary element, the second rotary element, and the third rotary element in the differential mechanism based on the electric power target value;
      calculating a change rate limit value of a supercharging pressure from the supercharger based on the electric power target value, the change rate limit value being an upper limit of the rate of change of the supercharging pressure, a value of the change rate limit value decreasing as the limitation of the charging/discharging electric power increases; and
      performing the gear shifting control by applying the change rate limit value of the supercharging pressure from the supercharger such that the change rate limit value is not exceeded by the engine.

2. The control device for a hybrid vehicle according to claim 1, wherein the value of the change rate limit value of the supercharging pressure is lower when a rate of change of a rotation speed of the first rotary machine is great than when the rate of change of the rotation speed of the first rotary machine is small.

3. The control device for a hybrid vehicle according to claim 1, wherein the value of the change rate limit value of the supercharging pressure is lower when a response delay of the supercharging pressure is great than when the response delay of the supercharging pressure is small.

4. The control device for a hybrid vehicle according to claim 1, the circuitry is configured to compensate for unevenness in a torque which is output to the transmission member based on a difference between a required engine torque and an actual engine torque due to the of the change rate limit value of the supercharging pressure using a torque of the second rotary machine.

5. The control device for a hybrid vehicle according to claim 1, wherein the value of the change rate limit value of the supercharging pressure is lower when a rate of change of a rotation speed of an AT input shaft of the mechanical gear shifting mechanism is great than when the rate of change of the rotation speed of the AT input shaft is small.

6. The control device for a hybrid vehicle according to claim 1, wherein the differential mechanism is a single-pinion planetary gear mechanism including a sun gear, a carrier, and a ring gear, the first rotary element being the carrier, the second rotary element being the sun gear, and the third rotary element being the ring gear.

* * * * *